(12) United States Patent
Carsten

(10) Patent No.: US 6,563,725 B2
(45) Date of Patent: May 13, 2003

(54) APPARATUS AND METHOD FOR CONTROL AND DRIVING BJT USED AS SYNCHRONOUS RECTIFIER

(76) Inventor: Bruce W. Carsten, 6410 NW. Sisters Pl., Corvallis, OR (US) 97330-9243

( * ) Notice: Subject to any disclaimer, the term of this patent is extended or adjusted under 35 U.S.C. 154(b) by 0 days.

(21) Appl. No.: 09/971,057

(22) Filed: Oct. 3, 2001

(65) Prior Publication Data

US 2003/0063484 A1 Apr. 3, 2003

(51) Int. Cl.$^7$ .......................... H02M 7/217; H02M 7/04
(52) U.S. Cl. ........................ 363/127; 363/89; 361/101
(58) Field of Search .......................... 363/127, 89, 97, 363/95, 137; 323/282, 283, 284, 285, 286; 361/98, 101, 91, 103

(56) References Cited

U.S. PATENT DOCUMENTS

| | | | |
|---|---|---|---|
| 3,582,758 A | | 6/1971 | Gunn |
| 3,940,682 A | | 2/1976 | Park et al. |
| 4,519,024 A | * | 5/1985 | Federico et al. ............ 363/127 |
| 4,716,514 A | | 12/1987 | Patel |
| 4,787,007 A | * | 11/1988 | Matsunura et al. ........... 361/98 |
| 5,373,225 A | * | 12/1994 | Poletto et al. .............. 323/282 |
| 5,387,882 A | * | 2/1995 | Schoofs ...................... 331/111 |
| 5,563,501 A | * | 10/1996 | Chan .......................... 323/282 |
| 5,710,519 A | * | 1/1998 | McCalpine et al. ......... 327/538 |
| 5,721,483 A | | 2/1998 | Kolluri et al. |
| 5,764,041 A | * | 6/1998 | Pulvirenti et al. .......... 323/282 |
| 5,905,368 A | | 5/1999 | Kolluri et al. |
| 6,304,066 B1 | * | 10/2001 | Wilcox et al. .............. 323/282 |

OTHER PUBLICATIONS

"A New Synchronous Rectifier Using Bipolar Junction Transistor Driven by Current Transformer", by Eiji Saki et al IEEE INTELEC Conference, 1992, pp. 424–429. No Date.

"A New Closed Loop Adaptive Base Drive Scheme Minimizes Transistor Drive & Saturation Losses", W.E. Rippel, Powercon II Conference, 1984, Dallas, TX, Section G–1, pp. 1–13. (No Date).

"Isolation of Faulted Power Modules in Low Voltage DC Distributed/Redundant Power Systems", Bruce Carslen, PCIM/PQ Conference, 1991, Universal City, CA, pp. 52–64 (No date.

* cited by examiner

Primary Examiner—Rajnikant B. Patel
(74) Attorney, Agent, or Firm—Steven J. Adamson

(57) ABSTRACT

A bipolar junction transistor (BJT) used as a synchronous rectifier (SR) that is driven and controlled by an electronic circuit, such that when the collector-emitter voltage (VCE) is above an offset voltage (VOS) the circuit drives the base of the SR BJT with a base current proportional to the difference between VCE and VOS, turning the SR BJT on with a base current proportional to the collector current. When the VCE of the SR BJT falls below VOS the drive circuit turns on a second transistor coupled between the base and collector of the SR BJT to turn the SR BJT rapidly off and maintains it in the off state as the collector voltage reverses. When the VCE of the SR BJT is exceeds a threshold voltage above the normal conduction VCE range, the control circuit increases the base drive current to accelerate the SR BJT turn-on process.

26 Claims, 13 Drawing Sheets

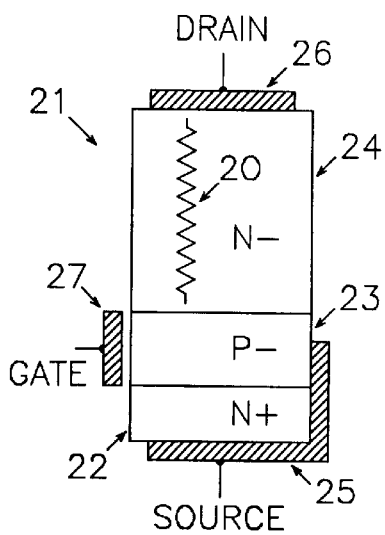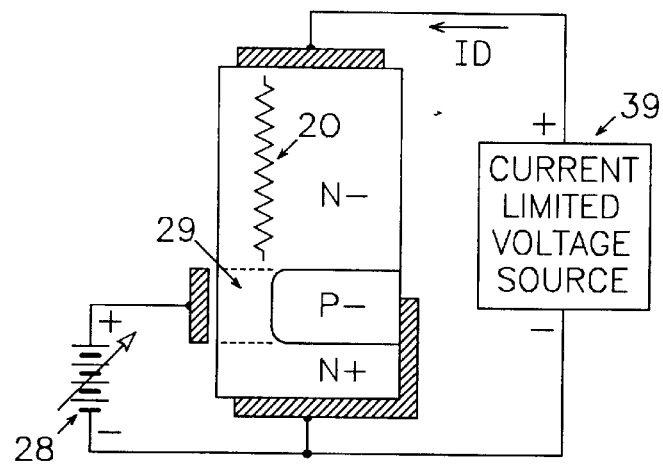
Fig. 3A    Fig. 3B
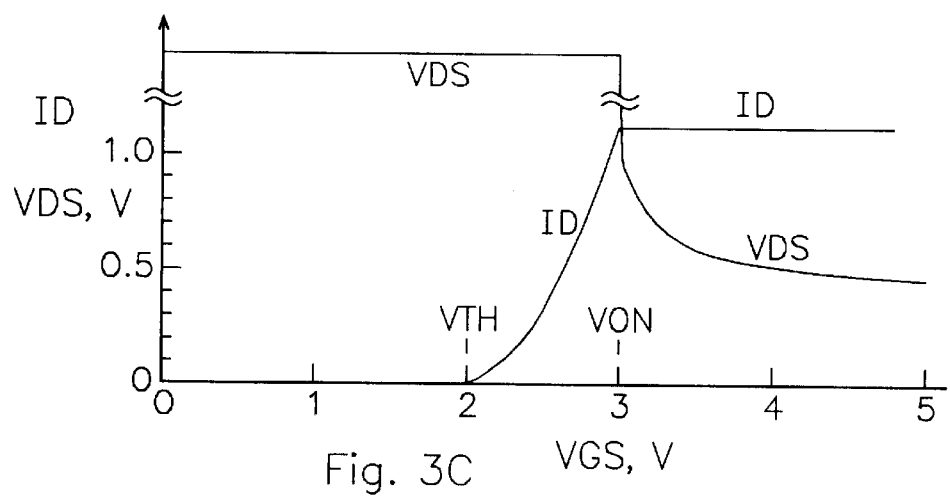
Fig. 3C

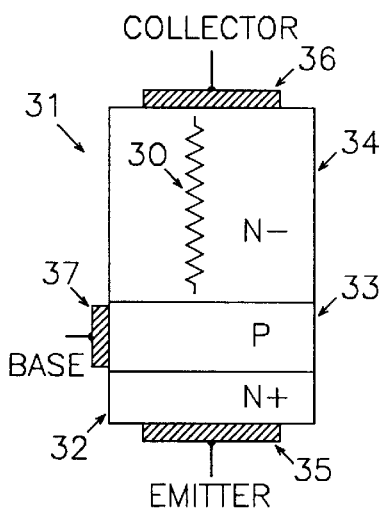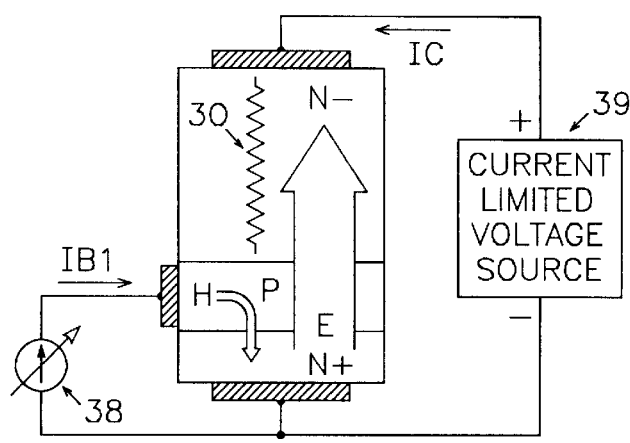
Fig. 4A  Fig. 4B
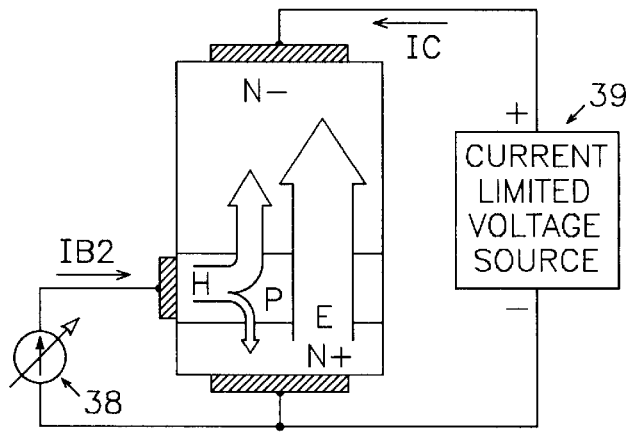
Fig. 4C
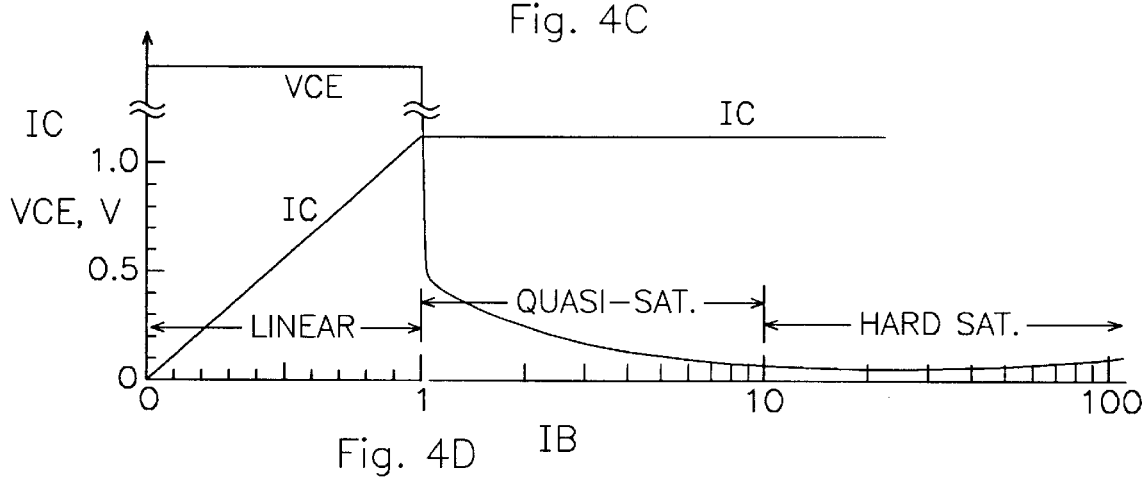
Fig. 4D

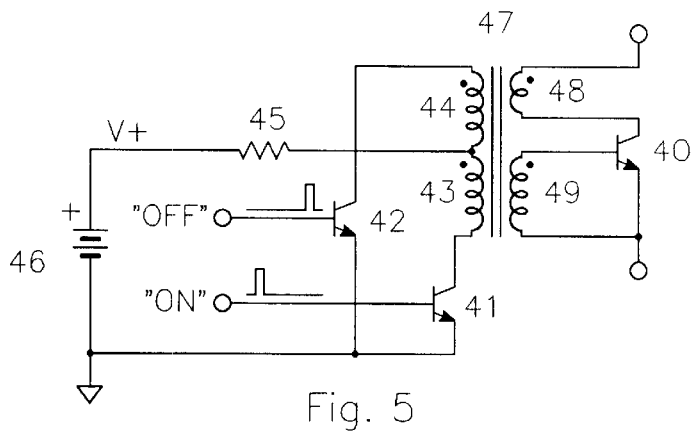
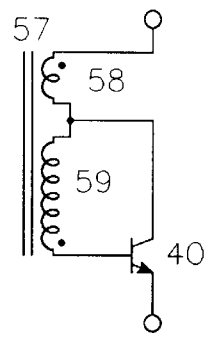
Fig. 5
PRIOR ART
Fig. 6
PRIOR ART
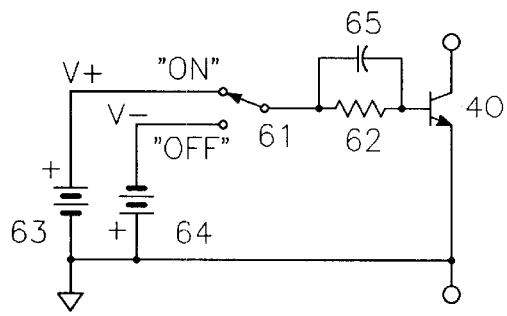
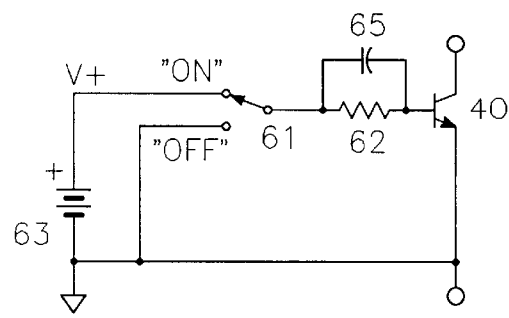
Fig. 7
PRIOR ART
Fig. 8
PRIOR ART
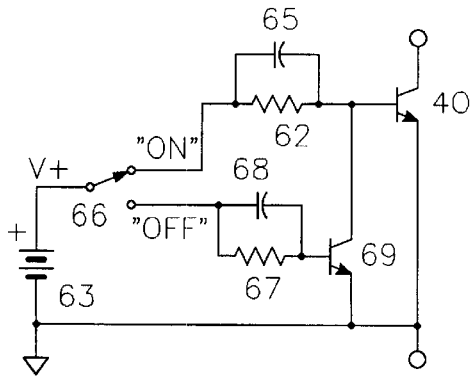
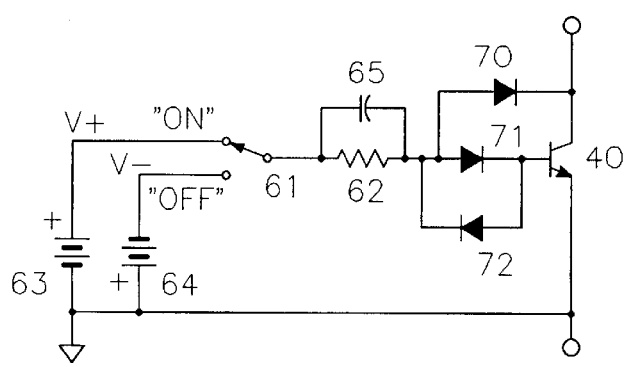
Fig. 9
PRIOR ART
Fig. 10
PRIOR ART

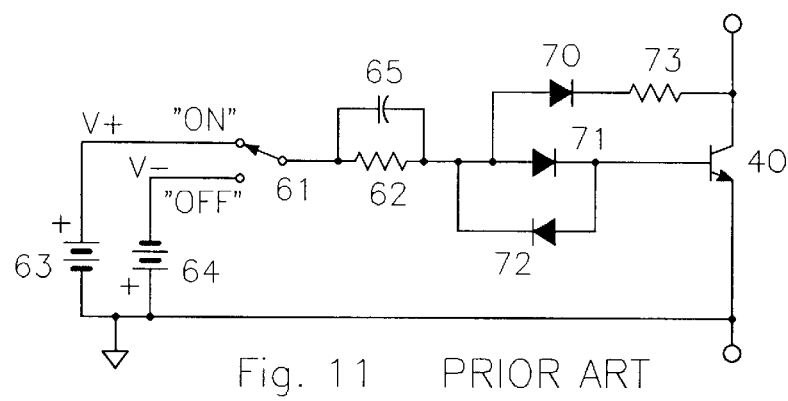
Fig. 11   PRIOR ART
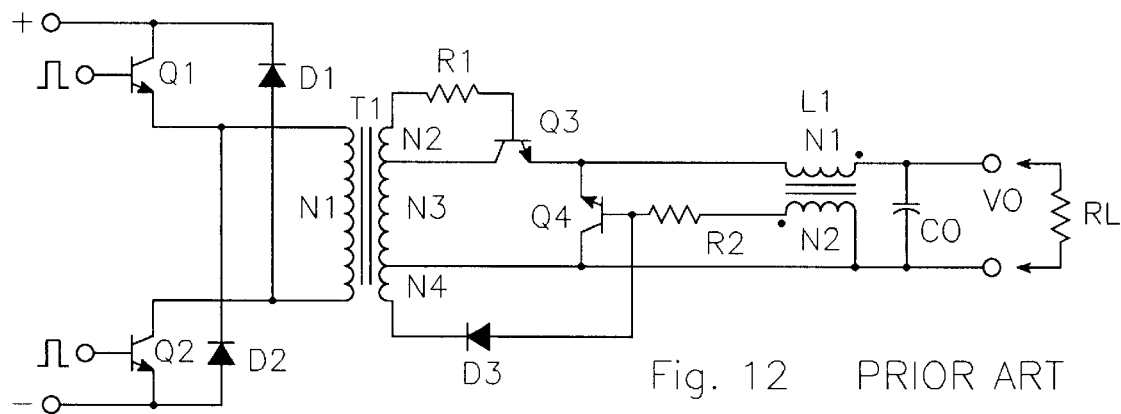
Fig. 12   PRIOR ART
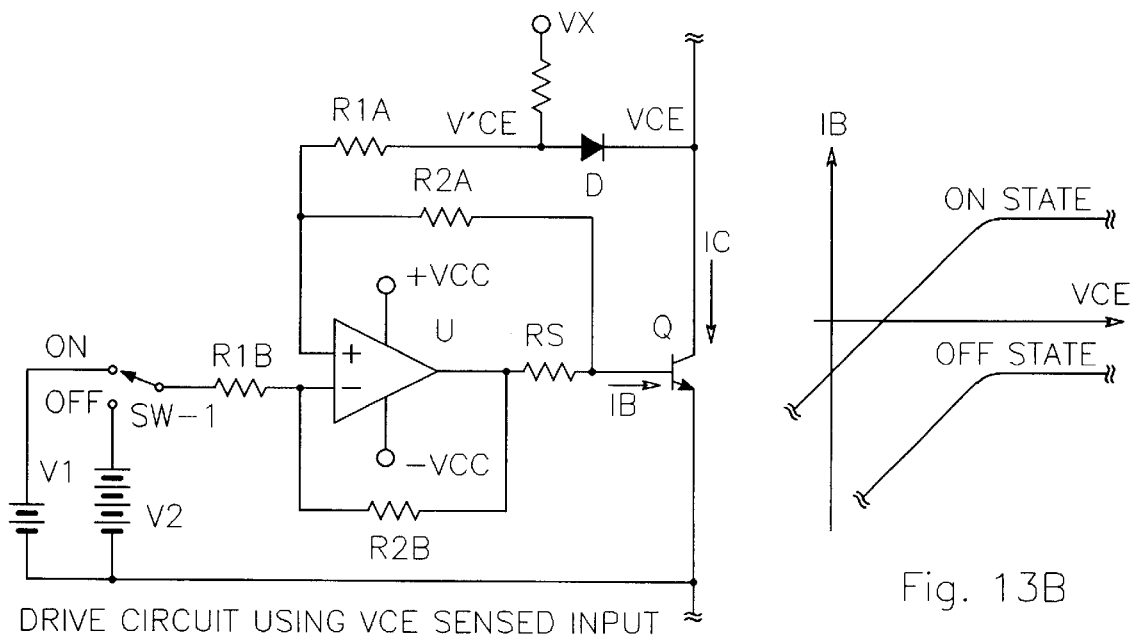
DRIVE CIRCUIT USING VCE SENSED INPUT
Fig. 13A   PRIOR ART
Fig. 13B

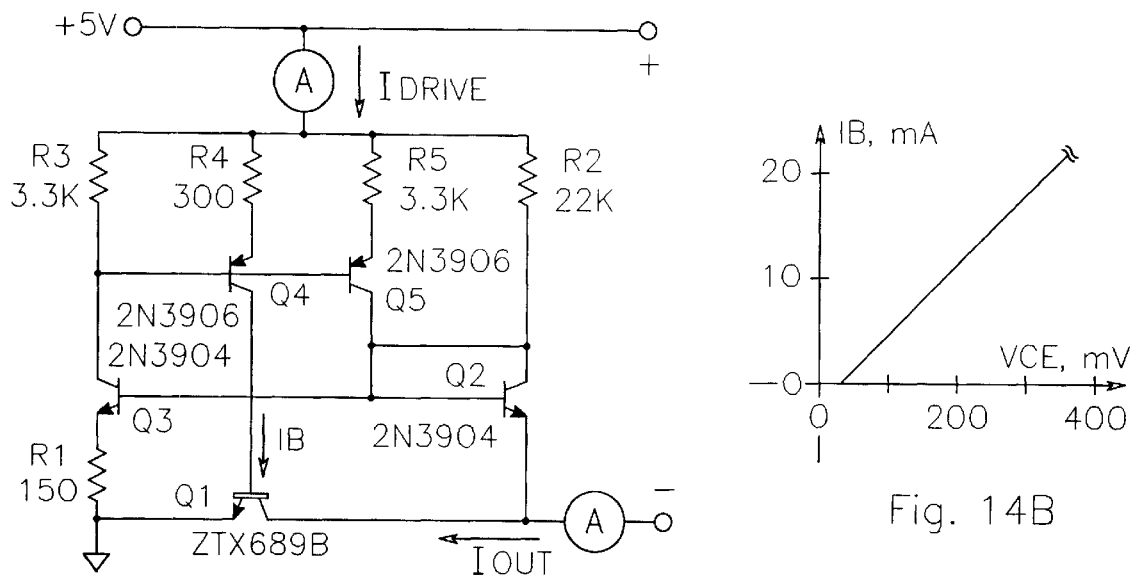
TEST CIRCUIT FOR BJT AS BLOCKING DIODE
Fig. 14A   PRIOR ART
Fig. 14B
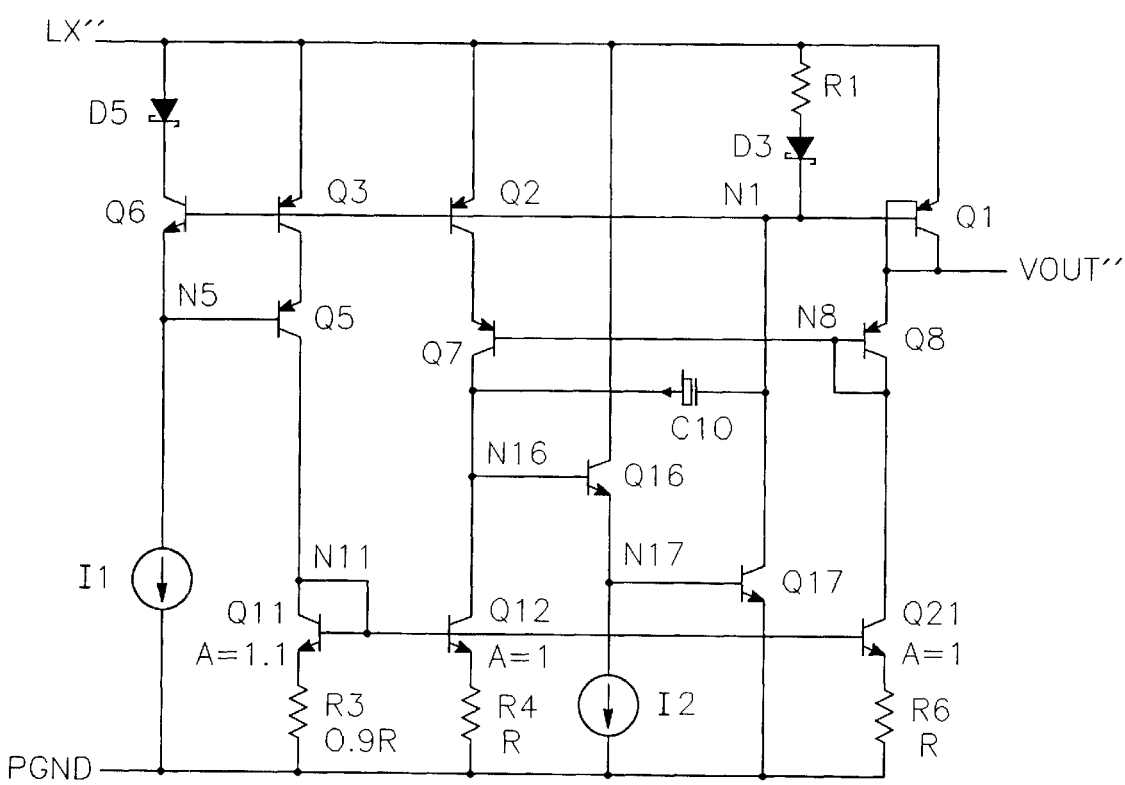
Fig. 15   PRIOR ART

APPARATUS AND METHOD FOR CONTROL AND DRIVING BJT USED AS SYNCHRONOUS RECTIFIER

CROSS REFERENCE TO RELATED APPLICATIONS

This application is related to the following applications:

U.S. patent application having Ser. No. 09/971,047, filed Oct. 3, 2001, and entitled Apparatus and Method for Turning Off BJT used as Synchronous Rectifier (by the same inventor as herein) which is hereby incorporated by reference as though it were disclosed in its entirety herein.

U.S. patent application having Ser. No. 09/971,048, filed Oct. 3, 2001, and entitled Apparatus and Method for Turning Off BJT used as Controlled Rectifier (by the same inventor as herein) which is hereby incorporated by reference as though it were disclosed in its entirety herein.

U.S. patent application having Ser. No. 09/971,096, filed Oct. 3, 2001, and entitled Apparatus and Method for Control and Driving BJT used as Controlled Rectifier (by the same inventor as herein) which is hereby incorporated by reference as though it were disclosed in its entirety herein.

FIELD OF THE INVENTION

The present invention relates to synchronous rectifiers and, more specifically, to the efficient, economical and optimal driving and control of a bipolar junction transistor (BJT) used as a synchronous rectifier (SR).

BACKGROUND OF THE INVENTION

To facilitate a better understanding of the present invention, the following information on the development of synchronous rectification and the operation of PN junction, field effect and bipolar semiconductor devices is presented.

DC to DC power converters are typically used to stabilize or isolate a power supply signal from upstream irregularities (i.e., voltage/power surges, momentary power outages, etc.). Various transformer and non-transformer based power converters are known in the art. These power converters typically employ a rectifying device to convert either a transformed AC signal, a chopped DC or a similar signal (depending on the power converter arrangement) into a DC output signal. This output DC signal constitutes a relatively stable power supply signal. Depending on the range of voltage (and current) for which the power converter is designed, the power converter may be used, for example, in power supplies for personal electronic devices, laptop or personal computers, engineering workstations and Internet servers. While the present invention is particularly concerned with electronic/digital logic circuits, it should be recognized that the teachings of the present invention are applicable to rectifying device operation in any voltage/current range and for any purpose.

For many years the standard power supply voltage level for electronic logic circuits was 5V. Recently, this voltage level has dropped in many instances to 3.3V and 2.5V, and there are plans within the industry to further reduce this voltage level. As this voltage level drops, however, the forward conduction voltage drop of the rectifying device becomes the dominant source of power loss and inefficiency. For example, a Schottky diode is typically used when a low voltage drop is desired, and a typical Schottky diode has a 500 mV forward voltage drop. This limits the theoretical efficiency of a DC to DC power converter to 80% at two volts output (before other power conversion losses are taken into account). This efficiency limit further decreases to less than 67% at one volt output, and 5% at 500 mV output. These efficiency limits are deemed unacceptable.

In addition to concerns about forward voltage drop and other power inefficiencies, power converters and rectifying devices therein are expected to have high power densities. This mandates a higher switching frequency such that less energy is processed in each switching cycle, which in turn permits smaller component sizes. Switching frequencies have risen from 5 to 20 KHz thirty years ago (where the push was to get above the audible range) up to 100 KHz to 1 MHz at present. Thus, technology that does not support rapid switching is not preferred for most rectification applications.

With respect to known semiconductor rectifying devices, these include rectifying diodes (PN and Schottky junction in Si, GaAs, etc.) and rectifying transistors (bipolar and field effect). The forward voltage drop of a rectifying diode can be reduced by design, but only to around 300 mV to 200 mV before a point of diminishing returns is reached where increasing reverse leakage current losses outweigh the decreasing conduction losses. This is due to an inherent physical limit of rectifying diodes and does not depend on semiconductor material or whether the construction is that of a conventional P-N junction diode or a Schottky junction diode. For this reason, amongst others, diodes are not desirable as rectifying devices for low voltage level applications.

Rectifying transistors in which transistor driving is in "synchronism" with the direction of current flow across the transistor have increased in popularity due to their favorable forward voltage drops relative to diodes. Typically, the synchronous rectifying transistor is driven "on" to provide a low forward voltage drop when current flow across the rectifying transistor is in a designated forward direction, and is driven "off" to block conduction when current flow across the rectifying transistor would be in the opposite direction.

Both the Bipolar Junction Transistor (BJT) and the Metal Oxide-Semiconductor Field Effect Transistor (MOSFET) have been used as a synchronous rectifier transistor, also termed a "synchronous rectifier" (SR). Although the BJT has a longer history of use as an SR, the MOSFET is used almost exclusively at present due to its fast switching speed and perceived ease of driving. BJTs are little used at present due to slow switching speeds in general, and a slow turn-off in particular.

The present invention recognizes that the BJT is a conductivity modulated device whereas the MOSFET is not. As a result of this distinction, the BJT can achieve a lower forward voltage drop for a given forward current density and reverse voltage blocking capability. Major technical costs of the lower voltage drop, however, are associated with the requirement to inject, maintain and remove the conductivity modulating stored charge. Nonetheless, the lower conduction voltage of the SR BJT could be used to advantage at lower output voltages, if the BJT switching speed (e.g., turn-off and turn-on) could be improved in a cost-effective and efficient manner (which as discussed below is a purpose, amongst others, of the present invention).

Though MOSFETs and BJTs have certain similarities in design and construction, they also have substantial differences that impact their behavior and the type of circuits that are suitable for driving them. This should be better understood after review of the following discussion of construction and operation of PN-junction, field effect and bipolar devices.

P-N Diode Construction and Operation

Semiconductor materials are nearly insulating in the pure state, but they may be doped with impurities to create mobile electric charges and improve their conductivity markedly. These impurities may be either "N" type (for "negative") which produces free electrons in the semiconductor material or "P" type (for "positive") which produces holes in the semiconductor material. The negatively charged free electrons are mobile, and will flow towards a positive charge and away from a negative charge. In P-type semiconductors, the "positive" charge carrier is the local deficiency of an electron, often referred to as a "hole," and holes are also considered to be mobile (such as an air bubble in water). Holes will flow in a direction opposite to that of electrons in the presence of an applied electric field. When no electric field is applied, mobile electrons and holes diffuse with no net flow in any direction.

FIG. 1A illustrates a representative P-N junction diode 1 formed by adjacent regions of equally doped P-type semiconductor 2 and N-type semiconductor 3. Conductive contacts for an anode (A) 4 and a cathode (K) 5 are made to regions 2 and 3, respectively. Diffusion of electrons and holes near the junction causes some to meet, recombine and neutralize each other; conceptually, the electrons fall into the holes. Fixed oppositely charged atoms are left behind, which produce a voltage field opposing further electron and hole flow towards the junction. A small region near the junction, often termed the "space charge layer," is left depleted of mobile charge carriers and the diode will carry essentially no current if small voltages are applied across the device.

FIG. 1B illustrates the P-N junction of FIG. 1A to which is applied a reverse biased voltage by voltage source 6. The negative terminal of the voltage source is connected to anode 4 and the positive terminal to cathode 5. This causes holes and electrons to move towards the oppositely charged electrodes and away from the junction, creating a larger depletion region. Only a small "leakage" current flows across this region and it is due to thermal (or radiation) generated electron-hole pairs.

FIG. 1C illustrates the same P-N junction exposed to a forward biased voltage by voltage source 7 and current limiting resistor 8. Both the holes and electrons can be thought of as being pushed towards the junction. When the forward junction voltage is greater than about 600 mV (for silicon), the depletion region is overcome and the holes and electrons cross over the junction in significant numbers. The electrodes replenish the supply of holes and electrons, and thus create a continuous forward current flow IF. For historical reasons, "current" is said to flow in the direction opposite to electron flow. Thus, the P-N junction diode allows current to flow in one direction but not in the other, and may be used to "rectify" and alternating current (AC) into a direct current (DC) which flows in only one direction.

FIGS. 2A–2B illustrate P-N junction diodes having unequal doping levels to achieve a higher reverse voltage capability. Diode 11 in FIG. 2A has a heavily doped "P+" region 12 and a lightly doped "N–" region 13. The lightly doped region has a significant electrical resistance, indicated by resistance symbol 14. The depletion region is much thicker in the N– than the P+ material, as equal charges must be drawn from both sides of the junction for recombination. This holds true when a reverse voltage is applied, as shown in FIG. 2b, and it is the much wider N– depletion region which sustains a higher reverse voltage before breakdown occurs. (Note that relative depletion region thickness is not shown to scale, typically differing by two to three orders of magnitude.)

In FIG. 2C, diode 11 of FIG. 2A is shown with an applied forward biased voltage. This diode initially has a higher "forward recovery" voltage than that of diode 1 (FIG. 1C) due to the voltage drop through resistance 14. The relative hole and electron currents crossing the junction are proportional to the relative doping levels, however, so there are far more holes flowing from the P+ region into the N– region than electrons flowing the other way. This heavy injection of holes into the lightly doped N– region attracts an equal number of electrons to maintain overall charge neutrality, creating a highly conductive electron-hole plasma which lowers the resistance of the lightly doped region dramatically. This conductivity modulation of resistance 14 causes the forward voltage drop to quickly approach that of diode 1 in FIG. 1c. However, the stored charge in the N– region must be removed by electron-hole recombination or a momentary reverse current flow, before reverse voltage blocking with low leakage currents can again be achieved.

MOSFET Construction and Operation

FIG. 3A illustrates an N-channel power MOSFET 21. The semiconductor structure of an N-channel MOSFET is that of two back-to-back P-N junctions. The power MOSFET 21 has an N+ source region 22, a central P– body or gate region 23, and an N– drain region 24. Source and drain electrodes 25, 26 are connected to the source and drain regions, respectively, and a gate electrode 27 is placed proximate yet insulated from P– body region 23. In power MOSFETs, source electrode 25 is normally extended to contact the body region, forming a P-N diode between source and drain, which will only block voltage with the drain positive relative to the source. Note that the gate electrode 27 was originally a metal (the "M" in MOSFET), but this metal has been largely replaced with doped polysilicon in most modern power MOSFETs. Nonetheless, the device name has remained unchanged.

Referring to FIG. 3B, when a sufficiently positive voltage (above the conduction threshold VTH) is placed on the gate electrode 27 via adjustable voltage source 28, it attracts enough electrons from the N doped regions to fill the holes in the nearby P– body region and provides extra electrons for conduction. This "inversion" of the effective doping polarity of the body near the gate electrode creates a conducting N-type channel 29 between the source and drain (thus the "N-channel" nomenclature).

If a current limited voltage source 39 is also placed on the drain and source terminals of the MOSFET and the gate voltage brought up from zero, the drain-source voltage (VDS) and drain current (ID) will behave as shown in FIG. 3C for a typical low voltage power MOSFET. Drain current is essentially zero until the conduction threshold (VTH) is reached, above which the drain current begins to climb at an increasing rate until the current limit of the voltage source is reached at (VON). At that point, the drain voltage falls quickly to a low level, about one volt in this example of a moderately high drain current density. The drain-source voltage falls a little further as the gate voltage continues to rise and creates a wider conducting channel, reaching about 450 mV at the nominal 5V gate drive level. At this point, the MOSFET exhibits an essentially constant resistance (ratio of VDS to ID), limited by the resistance 20 of the lightly doped MOSFET drain region. A lower drain voltage may only be obtained by operating the MOSFET at a lower drain current density.

Although a MOSFET requires no gate drive power to maintain conduction, a small amount of gate drive energy is required to charge the gate and establish conduction at each turn-on. Since this drive energy is normally lost at turnoff, a certain average drive power is required for repetitive switching. A moderately lower gate drive voltage could be used at lower drain currents, where VON is lower, but the savings in drive energy are modest. It is important to note that there is little power loss reduction or efficiency benefit in adjusting the gate drive voltage for different drain currents, and as a rule this is not done in switching or SR applications.

There are, however, a few evident exceptions to the rule. U.S. Pat. No. 5,038,266, granted to Callen et. al. on Aug. 6, 1991, for a High Efficiency, Regulated DC Supply, states in the abstract that "During the 'on' state of the MOS FET (sic) a feedback network varies the MOS FET gate voltage as necessary to provide regulation of the DC output voltage during the 'on' period." This produces a form of linear (dissipative) pass regulation of the output voltage over a limited range. A related technique is taught in U.S. Pat. No. 5,396,412 granted to Barlage on Mar. 7, 1995, for A Method of Synchronous Rectification and Adjustment of Regulator Output Voltage. The abstract states that "When the output voltage exceeds a reference voltage, the FET is gated off, causing the internal body diode to reduce the output voltage by a diode drop." In both inventions, the goal is to achieve some regulation of the output voltage through control of a SR FET, but in both cases the efficiency is reduced by this control.

BJT Construction and Operation

The semiconductor structure of an NPN BJT is similar in some aspects to that of an N-channel MOSFET as shown in FIG. 4A. The principal differences in construction are that a direct metallic connection 37 is made to the central P region 33 which becomes the base of the BJT 31, and there is no equivalent of a connection to the body with the source electrode. The MOSFET's source (of electrons) is emitter 32 and the MOSFET's drain (for electrons) is collector 34, with electrodes 35 and 36 contacting the emitter and collector respectively. The physics of BJT device operation, however, is very different from that of the MOSFET.

In FIGS. 4B and 4C, BJT 31 is driven to conduct a collector current (IC) with a base current (IB) from an adjustable current source 38. A current limited voltage source 39 provides a forward bias from collector to emitter. Various regions of operation of BJT 31 are illustrated in FIG. 4D, where the collector-emitter voltage (VCE) and IC are plotted as a function of IB. For this illustration, BJT 31 is assumed to be similar in size, construction and maximum voltage rating to the MOSFET of FIG. 3. Moreover, the drain and collector currents in FIGS. 3C and 4D are shown to the same scale, as are the "on" state conduction voltages VDS and VCE of the MOSFET and the BJT, respectively.

In the "linear" region of operation, where the collector voltage is well above the base voltage, the base current largely consists of holes (H) flowing from the base region into the emitter (FIG. 4B). The emitter is far more heavily doped than the base, causing a much larger current of electrons (E) to flow from the emitter back into the base. The base region is made very thin, however, and most of these electrons pass through the base region and into the collector, causing a collector current to flow, which is much larger than the base current. Some of the electrons from the emitter recombine with holes in the base, and a small extra base current flows to resupply these holes. An electron hole plasma also forms in the base region and results in a small stored charge, but these and related effects are generally of minor importance in "switching" applications and will be ignored. In the linear region of operation, IC is essentially proportional to IB until the current limit point of voltage source 39 is reached, where VCE then falls very quickly for a small increase in IB, as shown in the left portion of FIG. 4D. The current gain "β" of a BJT is the ratio of IC/IB in the linear region of operation.

For this BJT, similar in size and voltage rating to the MOSFET, the internal collector-emitter junction voltage is approaching zero when the external VCE falls to about 450 mV, due to the voltage drop on the internal collector resistance 30 (similar to that in the drain of the MOSFET). Unlike the MOSFET, however, the BJT is not limited to this voltage drop. The internal base-collector junction is now forward biased, and a further increase in base current (known as "base overdrive") causes holes to be injected into the collector as well as the emitter, as shown in FIG. 4C. (Note the change from a linear to a logarithmic IB scale at this point in FIG. 4D.) In this "quasi-saturation" region the holes injected by the base cause a conductive electron-hole plasma to form in the collector which lowers the resistance of the collector region by conductivity modulation, as occurred in the N− region of the diode of FIG. 2C. Higher base currents cause more holes to be injected into the collector, resulting in a denser plasma and a proportional reduction in VCE (the middle region of FIG. 4D) until the collector resistance becomes lower than other parasitic resistances in the BJT. At least initially, the decrease in conduction power loss outweighs the increase in base drive power loss. The "hard," "deep" or "full" saturation region is now entered, with VCE an order of magnitude lower than when quasi-saturation was entered. In hard saturation, a higher base current results in little change in VCE while increasing the stored charge in the collector plasma. VCE actually increases somewhat as the base current approaches the collector current in magnitude, due to increased emitter current resistive voltage drops as shown in the right portion of FIG. 4D. The power loss reduction benefits of base overdrive are lost as deep saturation is approached and entered.

The stored charge must be removed from the collector before the BJT can turn-off and sustain a reverse voltage without high leakage currents. Removal of this charge entails a turn-off storage time, which results in an inherently slower turn-off than is achievable with MOSFETs which do not have such a stored charge. Excessive base overdrive thus also slows BJT turn off and increases switching losses.

As well known in the art, a reduction in the required off-state blocking voltage allows a higher doping level in the collector, typically benefiting conduction voltage and switching speed. At some point the collector doping level exceeds that of the base, and may eventually become comparable to that of the emitter. Raising the collector doping level causes the depletion region (in the OFF state) and conductivity modulation (in the ON state) to transfer gradually from the collector region to the base region.

First, a high base drive current pulse must be supplied at turn-on to drive a BJT into quasi-saturation as quickly as possible to minimize turn-on switching losses. Second, the "on" base drive current must be controlled to provide a near optimal degree of BJT quasi-saturation to minimize the sum of drive and conduction losses over a range of conduction currents. Third, the quasi-saturation voltage v. drive current relationship must take switching frequency into account at higher frequencies, i.e., higher quasi-saturation voltages reduce the stored charge, leading to faster turn-off and lower switching transition losses. Finally, the conductivity modulating stored charge must be removed as quickly as possible through a high reverse base drive current, further minimizing turn-off losses. This latter aspect is discussed in more detail in the above-referenced U.S. Patent Application having docket Ser. No. 09/971,047.

Prior art circuits for driving a MOSFET, whether as a conventional transistor or as a synchronous rectifier, are essentially concerned only with when to turn the MOSFET on or off, whereas optimal driving of a BJT must also provide an adaptive drive level, depending at least on the BJT conduction current. Thus the prior art techniques developed for driving a MOSFET are largely irrelevant to the driving of a BJT, whether as a conventional switching transistor or as a SR; the driving of a BJT is significantly more complex and demanding.

It has long been known that, as a general rule, the "optimal" base drive to keep a BJT in a desired state of quasi-saturation to minimize drive and conduction power losses is to operate at a constant forced current gain βf, defined as:

$$\beta f = IC/IB \quad (1)$$

where βf is less than β in the linear region of operation. Based on both simple theory and empirical measurements, the inventor herein has found that the collector-emitter resistance (Rce) of high gain BJTs (for VCE less than a few 100 mV) may be closely approximated by:

$$Rce = Kr/IB + Ro \quad (2)$$

where Kr is a constant, which depends on the BJT design and construction. Thus, the resistance Rce is the sum of a conductivity modulated term inversely proportional to the base current (Kr/IB) and a fixed resistance (Ro) which is not affected by the base drive current. The collector-emitter voltage, VCE, is the product of IC and Rce, which yields:

$$VCE = Kr(IC/IB) + (IC)(Ro) \quad (3)$$

If the BJT is to be operated at the forced gain of equation (1), it can be calculated from equations (1) and (3) that:

$$IB = Kb(VCE - VCEOS) \quad (4)$$

where "VCEOS" is a collector-emitter "offset" voltage given by:

$$VCEOS = (\beta f)(Kr) \quad (5)$$

and "Kb" is a constant of proportionality:

$$Kb = 1/(\beta f)(Ro). \quad (6)$$

Thus, the present invention recognizes that the BJT will be driven at an essentially constant forced current gain if the base drive current is made proportional to the difference between the collector-emitter voltage and an offset voltage.

Various prior art circuits for driving a BJT are discussed below after the following definitions and notes. These prior art arrangements include those that drive a BJT used as a conventional transistor and those that drive a BJT used as a synchronous rectifier. As noted above, prior art techniques used for driving a MOSFET in either application are not relevant to the driving of a BJT, and are thus not discussed herein.

Definitions and Notes

In the following discussion, and for the remainder of this document, the following definitions and subsequent notes generally apply to circuits using BJTs as synchronous rectifiers, unless otherwise stated or intrinsically implied.

1) A "transistor" is an active (controllable) semiconductor device with at least three electrodes, such that the signal present at one electrode controls the state of conduction between the other two electrodes.

2) The generic term Field Effect Transistor (FET) is used to include the Junction Field Effect Transistor (JFET) as well as the MOSFET, which in turn is used generically for any Insulated Gate FET (or IGFET), including the less commonly used Metal-Insulator-Semiconductor FET (MISFET) device.

3) A "positive" voltage will be that which is normally applied to the collector of a BJT relative to the emitter, or to the drain of a FET relative to the source, when the device is operating as a conventional transistor; a "negative" voltage will be one of reverse polarity.

4) The collector voltage of a BJT will be said to be "above" the emitter voltage when it is of a positive polarity (as defined above), and will be said to be "below" the emitter voltage when it is of a negative polarity, hence "above" is used generally as synonymous with "positive" and "below" is used generally as synonymous with "negative".

5) A "positive" current flow is one which occurs in normally conducting BJTs and FETs, i.e., from collector to emitter or drain to source respectively, regardless of device polarity; a "negative" or "reverse" current flow is in the opposite direction. Likewise, a "positive" base current is in a direction to turn a BJT "on" or cause it to conduct current, while a "negative" or "reverse" base current is in the opposite direction, which will turn a conducting BJT "off", again regardless of device polarity.

6) A BJT "anti-saturation" circuit is one which decreases the base drive current when the collector voltage falls below some low level, and prevents the BJT from entering deep saturation.

7) A "power" transistor is a relatively high current (typically greater than one ampere) BJT or FET serving as a conventional transistor or, in the present application, as a synchronous rectifier.

8) The essentially symmetrical structure of a BJT allows it to be operated in an "inverted" mode, where the function of the collector and emitter are interchanged. The terms "emitter" and "collector" will be used in their functional context, wherein the magnitude of the emitter current of a conducting BJT is the sum of the base and collector currents of the same polarity, and is therefore larger in absolute value than either the base or collector current.

9) The structure of a power MOSFET is normally asymmetrical, as are some integrated circuit (IC) FETs, with the body of the FET shorted to the source terminal. Low voltage FETs used in ICs may be essentially symmetrical, with the FET body connected to the substrate or to a supply voltage. In the case of a symmetrical FET construction, the terms "source" and "drain" are used in their functional context in a circuit.

10) An NPN BJT and an N-channel FET are considered to be of the same "polarity" whether the FET is a MOSFET or a JFET.

11) A PNP BJT and a P-channel FET are considered to be of the same polarity and of opposite polarity to an NPN BJT or an N-channel FET.

12) Unless otherwise defined, diodes may consist of: a P-N semiconductor junction; a metal-semiconductor junction (i.e., a Schottky diode); or a diode connected transistor, wherein the base of a BJT is connected to the collector or the gate of a MOSFET is connected to the drain, or a like device. For a given semiconductor material, the forward voltage drop of a Schottky diode is less than that of a P-N junction diode or a diode connected BJT. The forward conduction voltage drop of a diode connected MOSFET is determined by the drain current vs. gate voltage relationship, which depends significantly on design and construction, but is typically greater than that of a P-N junction diode or diode connected BJT.

13) The terms "rectifier" and "diode" are often used synonymously, although there are distinctions: a rectifier is a device that allows current to pass in only one direction, whereas a diode is (at least functionally) a two terminal device that may be used as a rectifier.

14) A "transconductance amplifier" is an amplifying device or circuit that produces an output current proportional to an input voltage or to the voltage difference between two inputs. In some cases, the proportionality constant of this amplifier may be defined by a control voltage or current on another input.

The symbols used for transconductance amplifiers herein are those of a conventional voltage input/voltage output operational amplifier with a current source symbol added to the output. A "double circle" current source symbol is used when the output current may be of either polarity, as first used in FIG. 16A, while a "single circle with enclosed directional arrow" current source symbol is used when the amplifier can only source current (as in FIG. 17A) or sink current (FIG. 19).

Note that definitions (3), (4) and (5) above are equivalent to conventional usage when applied to NPN BJTs and N-channel FETs, but are the opposite of conventional usage when applied to PNP BJTs and P-channel FETs. This is done to achieve terms in the claims that are independent of the polarity of device used. Also note that:

1) The polarity of an entire circuit may be changed by changing the polarity of all transistors, and reversing the polarity of all diodes, voltage sources and current sources, without changing the essential behavior of the circuit. It is also recognized that FETs may often be substituted for BJTs and vice versa, particularly in a control or logic circuit, without changing the essential nature, function or behavior of the circuit. For this substitution the collector, base and emitter of a BJT are equivalent to the drain, gate and source of a FET, respectively. The principle limitation of device substitution is that devices must remain of the same type when a matching of characteristics is required.

2) BJTs are conventionally considered to be current driven devices, due to the roughly constant ratio between the base drive and collector currents over several decades of current, during which the base-emitter voltage changes by only a few hundred mV. FETs on the other hand are considered to be voltage driven devices, as the gate-source voltage controls the drain current with essentially no gate current flow under steady state conditions.

3) Base current drive for BJTs (e.g., a turn-on or turn-off drive command as discussed below) is usually shown herein as derived from a voltage source and a current determining resistor, but various well known current source circuits may be used instead.

4) The concept of an "optimal" BJT base drive current is utilized herein as that drive current which minimizes (or "optimizes") the sum of BJT conduction and base drive power losses for a given collector current. The optimal base drive current may also include the effects on switching losses, as well as BJT operating temperature. However, such "optima" are (as here) typically very "broad", or insensitive to moderate deviations from optimum conditions. For example, if the base drive current (and drive power loss) is 10% above or below the theoretical optimum, the change in conduction loss will be 10% lower or higher respectively, and the sum of the two losses will only rise by about 0.5%, and is.obviously well within the scope of "optimal" drive operation in practice. Operation at twice (or half) the theoretical optimum base drive, on the other hand, will raise the sum of drive and conduction losses about 25%, which begins to represent a significant loss in performance. The extent to which the losses are minimized is a design choice, and operation at some remove from a theoretical "optimum" may be necessary or unavoidable. Circumstances leading to deviations from an optimum BJT base drive include but are not limited to: fabrication and process variations in component values or properties; a requirement to use standard components and/or component values in the drive circuit; the desire or need to "standardize" a drive circuit for a range of BJT SR devices; or the need to operate over a range of frequencies in a given application, such as in a resonant converter.

PRIOR ART

While there are several prior art techniques for driving a BJT, not all of these are applicable to driving a BJT used as a synchronous rectifier (SR). A reason for this inapplicability is that in conventional BJT implemented circuits the applied voltage does not reverse polarity, while in synchronous rectification the applied collector-emitter voltage does reverse direction. In addition, in synchronous rectification a BJT SR must be turned-off rapidly when current would reverse direction.

FIG. 5 illustrates a transformer-coupled proportional base drive technique, also known as regenerative drive. Turn-on of power BJT 40 is accomplished by turning transistor 41 on momentarily, which draws a pulse of current from voltage source 46 through current limiting resistor 45 and winding 43 of transformer 47. This current is transformed into a pulse of current in the base of BJT 40 through winding 49, turning BJT 40 on. Collector current in BJT 40 is then transformed into a proportional base drive current by the turns ratio of windings 48 and 49. Turn-off is accomplished by turning 42 on momentarily, which pulses sufficient current through winding 44 to overcome the collector current in 48, reversing the base drive current and turning BJT 40 off.

This drive method has numerous advantages, including an optimal base drive during conduction through direct "sensing" of the collector current, fast turn-on and turn-off, a near minimum drive power requirement, transformer isolation between the drive circuitry and the power transistor, and operation from a single drive supply voltage. A disadvantage is an inability to turn the BJT off under "fault current" conditions, when resistor 45 limits the turn-off drive to the point where the BJT 40 base drive current cannot be reversed to initiate the turn-off process. Other disadvantages relate to the requirement for a transformer which tends to be relatively large and expensive and which places limits on the maximum conduction duty cycle due to the need to reset the core magnetization current during the "off" interval. This drive method can be adapted to the reversed conduction blocking direction required of synchronous rectification by moving one end of winding 49 from the emitter of BJT 40 to the collector, as is done with winding 59 in FIG. 6 below.

FIG. 6 illustrates another adaptation of a regenerative drive current transformer to a BJT SR. The opposite end of the base drive winding 59 has been moved from the emitter to the collector of BJT 40 to allow automatic turn-on when the VCE of BJT 40 becomes positive, and again there is an optimal base drive current during conduction. Turn-off is also automatic because a reverse current in winding 58 reverses the base drive current in winding 59. Other advantages of the embodiment of FIG. 6 are an absolute minimum of base drive power consumption and no need for base drive voltage sources. Versions of this BJT SR drive method have been utilized in U.S. Pat. No. 3,582,758, granted to Gunn on Jun. 1, 1971, for a Rectifier using low Saturation Voltage Transistors, and U.S. Pat. No. 3,940,682, granted to Park et. al., on Feb. 24, 1976, for Rectifier Circuits using Transistors as Rectifying Elements, among others.

Disadvantages are a relatively slow turn-on and turn-off unless additional circuitry is employed, as discussed by Eiji Sakai and Koosuke Harada in "A New Synchronous Rectifier Using Bipolar Transistor Driven by Current Transformer," published in the proceedings of the IEEE INTELEC 1992 conference, pp. 424–429. The principal drawback of the circuits illustrated in FIGS. 5 and 6 is the requirement for the drive transformer itself, which is relatively large and expensive, and thus unsuitable for large volume, low cost, high power density circuits. Use of a drive transformer also places restrictions on the relative "on" and "off" periods of a driven BJT, as noted above.

Various transformerless BJT drive circuits are illustrated in FIGS. 7 through 11. In the circuit of FIG. 7, switch 61 connects a base driving resistor 62 to a positive voltage source 63 for turn-on of BJT 40, while turn-off is accomplished by switching the resistor to a negative voltage source 64. A faster turn-on and turn-off is provided by surge currents through a "speed-up" capacitor 65, which may have a series resistance (not shown) to limit the surge current. Besides the requirement for a second drive voltage of opposite polarity, the principle disadvantage of this circuit is a constant base drive current regardless of collector current. This causes BJT 40 to be overdriven into deep saturation at collector currents somewhat less than the design maximum, increasing power losses through slower switching and excess drive currents. The "on" and "off" base drive currents, and thus the saturation voltages and switching times are also dependent on (and will vary with) the drive supply voltages. This can become problematic, particularly when the drive supply voltages are derived from a winding on a power converter transformer or inductor.

The need for the second drive voltage can be avoided by using the circuits of FIGS. 8 and 9. In FIG. 8 the negative voltage source 64 is simply eliminated and switch 61 now connects to the circuit "common" to turn BJT 40 off. There is still a turn-off base current pulse due to the "on" state voltage on capacitor 65, but turn-on and turn-off will be a little slower unless the size of capacitor 65 is increased to compensate for the lower voltage swing on 62 and 65. An alternative approach to speed up turn-off, which requires more drive charge (product of current and time) than for a fast turn-on, is shown in FIG. 9. Turn-on of BJT 40 is essentially similar to FIGS. 7 or 8, but turn-off is accomplished by switching the drive voltage 63 to a second (smaller) BJT 69, through drive resistor 67 and speed-up capacitor 68 which "shorts out" the base of BJT 40 to the emitter. Since the turn-off base current can be very high due to the current gain of BJT 69, the turn-off can be faster than with previous approaches if the internal base impedance of BJT 40 is sufficiently low. While the drive circuit of FIG. 7 could be used for synchronous rectification as long as the negative drive voltage 64 is greater than the reverse collector voltage on BJT 40, the drive circuits of FIGS. 8 and 9 cannot be so used. This is because when the collector voltage on BJT 40 becomes negative during the intended "off" period, a positive base current will flow through resistor 62 (in FIG. 8) or BJT 69 (in FIG. 9), turning BJT 40 "on" in the inverted mode.

The problem of a constant base drive current "overdriving" the BJT at lower collector current in FIGS. 7–9 can be addressed with a Baker clamp anti-saturation circuit. An example is shown in FIG. 10, with diodes 70, 71 and 72 added to the drive circuit of FIG. 7. Diode 71 biases the anode of diode 70 a "diode drop" (about 0.7 V) higher than the base of BJT 40 during the "on" drive period. When the collector voltage of BJT 40 falls below the base voltage, diode 70 conducts to divert excess base drive current to the collector, reducing the base drive until the collector voltage ceases to fall. This keeps BJT 40 out of deep saturation, but the collector-emitter "on" voltage is now nearly constant with the collector current; the VCE could be lower at lower currents to reduce conduction loss. Diode 72 allows reversal of the BJT 40 base current for driving turn-off of that transistor.

As shown in FIG. 11, the Baker clamp performance can be improved by the addition of a resistor 73 in series with diode 70. At lower collector currents there will be more base drive current diverted through diode 70 and the increased voltage drop on resistor 73 allows the VCE of BJT 40 to fall to a lower level. Suitable selection of component values allows an essentially constant forced gain of BJT 40 to be achieved. The Baker clamp could also be applied to the drive circuits of FIGS. 8 and 9, but they would still not be suitable for synchronous rectification driving due to SR BJT turn-on with a negative collector voltage applied.

Although the modified Baker clamp circuit of FIG. 11 could be made "self driving" with additional circuitry to determine when the BJT SR should be turned "on" and "off", it would still have several severe limitations in addition to the requirement for two drive supply voltages. First, the drive current is always at the high level required for the maximum collector current, with the excess drive current simply diverted to the BJT collector at lower collector currents. Thus drive power savings at lower collector currents are not realized. A greater problem is the insufficiently accurate control of IB vs. VCE for SR applications.

The point of synchronous rectification is to achieve a lower voltage drop than obtainable with conventional P-N or Schottky diodes, which can be as low as 300 mV or less for applications below 10V DC output. Thus, BJT SR quasi-saturation voltages must be in the range of a few tens of mV to about 200 mV maximum for there to be any efficiency advantage in using BJTs as synchronous rectifiers. This requires a VCE sensing and control accuracy of perhaps 5–20 mV or better over a wide range of ambient and junction temperatures, from −65° C. to +125° C. ambient in severe applications, with BJT SR junction temperatures perhaps 5–50° C. higher than ambient.

A Baker clamp (and other BJT anti-saturation circuits) controls IB based on the collector-base voltage VCB of a BJT, rather than the collector-emitter voltage VCE, which differs from VCE by the base-emitter "diode" voltage VBE. The forward voltage drop of diodes (including the VBE of BJTs) can vary by 50–100 mV or more from one device to another (unless part of the same integrated circuit), and the forward drop changes with temperature at a typical rate of 2 mV/° C. Even if diodes 70 and 71 of FIG. 11 are matched and thermally coupled, problems are still encountered with variations in the VBE "diode" voltage of BJT 40 (both from device-to-device and with temperature changes). Thus, the Baker clamp can control the IB vs. VCE relationship only to within about 200 mV or so, which is wholly inadequate for low voltage SR applications. Other prior art BJT anti-saturation circuits utilize only a diode coupled between the base and collector of a BJT, without a diode in series with the base drive (such as diode 70 in FIGS. 10 and 11). These might appear to overcome the 2 mV/° C. temperature coefficient (TC) problem, with the TC of the anti-saturation diode compensating for that of the VBE of the BJT, but this is not the case. The junction temperature of the BJT, which is dissipating significant power, will not match that of the anti-saturation diode. Even a modest 25° C. junction temperature difference will result in about a 50 mV error in the VCE quasi-saturation voltage, which is unacceptable for low voltage SR applications.

Other prior art circuits have also been developed to provide some form of "self driving" for a BJT used as a SR. These circuits are now discussed.

FIG. 12 is a reproduction of FIG. 1 of U.S. Pat. No. 4,716,514, issued to Patel on Dec. 29, 1987, for a Synchronous Power Rectifier. When primary side transistors Q1 and Q2 are on and SR Q3 is to conduct, it is turned on by the voltage on the N2 winding of transformer T1 producing a current flow in R1. When Q1 and Q2 turn-off, the voltage on N2 reverses and turns Q3 off (in a manner similar to FIG. 7 without the speedup capacitor, while Q4 is turned on by the voltage on the N2 winding of inductor L1 causing a current to flow in resistor R2. A problem arises when Q1 and Q2 turn back on as the voltage on N2 of L1 tries to keep Q4 on when it must be turned off. This problem is solved by the addition of winding N4 to transformer T1 which forces Q4 to turn-off by reversing the base current flow of Q4 through diode D3.

Advantages of this circuit are that no drive voltage supplies are required for turn-on or turn-off, and no additional magnetic devices are required. Disadvantages of this circuit, on the other hand, are several. Extra-windings are generally required on the existing magnetics and the turn-off drive delivery may be delayed which results in higher losses than with a timely delivered turn-off drive command. Perhaps more significant, are the problems previously discussed in regard to the prior art circuit of FIG. 7. First, the available drive currents vary with changes in operating voltages. A severe example occurs when the output (Vo) is overloaded and the voltage falls to near zero, providing no drive voltage to turn-on Q4 (when Q3 is off) until the voltage on Q4 becomes relatively high, causing large conduction losses. Second, the SR BJT base drive currents are "fixed" and do not change with collector current, driving the SR BJTs into deep saturation at lower current levels, slowing switching and increasing power losses. This circuit as taught lacks the switching speed-up capacitors and Baker clamp circuits discussed previously, but these could be added by a skilled practitioner. Nonetheless, the problem of a lack of precise control of BJT SR quasi-saturation voltages would remain.

FIGS. 13A and 13B are reproductions of FIGS. 5 and 6 from a paper by W.E. Rippel entitled "A New Closed Loop Adaptive Base Drive Scheme Minimizes Transistor Drive and Saturation Losses," published in the proceedings of Powercon 11 (Section G1, pp. 1–13), April 1984, Dallas, Texas. The designators "U" and "Q" have been added to the operational amplifier (op-amp) and BJT of FIG. 13A, respectively. This paper is a good tutorial on the prior art of driving BJTs and is incorporated herein by reference.

When the switch SW-1 of FIG. 13A is in the ON position, the op-amp U generates a voltage across resistor RS (and thus a base drive current IB) which is proportional to the difference between voltages V'CE and V1. Since the voltage V'CE is the sum of the voltage drop on diode D and the collector-emitter voltage (VCE) of BJT Q, this circuit can, over a range of VCE, produce a base drive current proportional to the difference between VCE and an offset voltage as required by equation (4) and as shown qualitatively in FIG. 13B for the curve labeled "ON-STATE." Note that equation (4) herein is equivalent to equation (8) in the Rippel paper, although derived by a different procedure. When switch SW-1 is in the OFF position, IB is depressed to the point where it is always negative regardless of VCE, as shown in the FIG. 13B curve labeled "OFF-STATE", and BJT Q is turned off.

This circuit achieves proportional base drive without the use of drive transformers, has high base overdrive capability for fast turn-on and turn-off, and has fewer sources of error in controlling IB vs. VCE than that of FIG. 11. Nonetheless, temperature and device-to-device variations in the forward voltage drop of diode D would still produce errors in VCE control that are perhaps ten times those that are tolerable in SR applications. It should be noted, however, that the control accuracy is quite acceptable in its intended application, which (in the paper) is the driving of 450V Darlington BJTs. The stated VCE "saturation" voltage of this high voltage BJT is given as 2.0 V maximum under rated conditions. Although not explicitly noted, quasi-saturation voltages seem to be in the range of 1.3V at lower currents to possibly 4V at maximum current, based on the marginally readable oscilloscope photographs of FIGS. 11–16 in the paper.

Although the circuit of FIG. 13A was not designed to drive a BJT as a SR, it could perform this function if SW1 were left in the ON position, as the BJT Q would be turned off whenever the current IC tried to reverse (causing a negative VCE). The IB vs. VCE control accuracy is inadequate for low voltage SR applications, however, due to the uncompensated voltage drop on diode D, which is added to VCE of Q to produce the voltage V'CE actually sensed by amplifier U.

The circuit of FIG. 14A is reproduced from FIG. 7 of a paper by the inventor herein entitled "Isolation of Faulted Power Modules in Low Voltage DC Distributed/Redundant Power Systems" published in the proceedings of the PCIM'91 conference, pp. 52–64, September 1991, in Universal City, Calif. (resistor designators have been added). This paper proposed the use of a BJT as a reverse current "blocking diode" in the output of paralleled low voltage power supplies. The BJT drive circuit of FIG. 14 senses the VCE of Q1 with BJTs Q2 and Q3 coupled to the collector and emitter of Q1, respectively. Feedback through Q5 keeps the currents in matched BJTs Q2 and Q3 equal when Q1 is conducting so that the voltage on resistor R1 is equal to the VCE of Q1, and thus the current in R1 is accurately proportional to VCE. When the VCE of Q1 rises to about 30 mV, the 200 uA current in R1 (and R3) produces a sufficient voltage across R3 to begin turning Q4 on. The base drive current to Q1 from Q4 is then proportional to the increase in the Q1 VCE voltage, satisfying the relationship of equation (4) with a forced gain βf of 167. The base current IB of Q1 is plotted as a function of VCE in FIG. 14B.

An advantage of this circuit is that the accuracy of VCE sensing is many times better than that of the other prior art discussed. In addition, turn-on is automatic and reasonably fast, requiring a momentary high positive VCE on Q1 to generate the turn-on base drive current pulse. No provision was made for turning Q1 off, however, and any VCE below 30 mV simply causes base drive to Q1 to cease. The Q1 self turn-off time is on the order of one to several microseconds, which is very slow by fast rectifier standards, but would be adequate for the intended isolation of a faulted power module, particularly compared to the alternative use of fuses with "blowing times" on the order of milliseconds. Adapting this BJT drive method, with its accurate sensing of VCE and control of BJT base current, to perform SR at high frequencies is an object of the present invention.

Another technique for controlling the drive current of a BJT SR to avoid deep saturation is taught in two related U.S. Pat. Nos. 5,721,483 and 5,905,368 granted to Kolluri et. al. on Feb. 24, 1998, and May 18, 1999, respectively, both for a Method and Apparatus for Enabling a Step-up or Step-down Operation Using a Synchronous Rectifier Circuit. FIG. 5 from both of these patents is reproduced as FIG. 15 herein. FIG. 15 illustrates a synchronous rectifying BJT Q1 of the PNP type (as opposed to the NPN type used for illustration of the present invention further below).

Kolluri et al. states in the '386 patent that "In the preferred embodiment, the base drive to the PNP pass transistor is controlled such that the collector current is about 0.9 times the collector current value if the device were operating with VCB of 0 V" for which ". . . the VCE across the device is approximately 200 mV . . . ." (Col. 6, lines 32–39.)

In essence, this is accomplished by using Q2 as a "replica" device which is "scaled 1/N of PNP pass transistor Q1" (Col. 6, line 50). Transistors Q6 and Q5 force Q3 to operate with a VCB of approximately zero volts, but transistor Q2 (matched to Q3) is made to conduct about 90% of the Q3 collector current by the 1:0.9 scaled current mirror consisting of Q11 and Q12 with emitter resistors R3 and R4, respectively. Since Q2 and Q3 have the same VBE, Q2 conducts only 90% of the collector current that would flow if VCB were zero, and is thus on "the edge of saturation." Furthermore, the control circuit also maintains a close relationship between the VCE of replica device Q2 and that of PNP pass transistor Q1, through the action of transistors Q7, Q8 and associated circuitry (Col. 6, lines 54–56). Since Q1 and Q2 also have the same VBE, Q1 likewise operates on "the edge of saturation" with a forced gain about 10% lower than the IC/IB ratio at VCB=0.

The principal drawback of this approach is that the drive control circuit requires transistors which are accurate "scale models" of the SR transistor, and is thus only suitable for applications where the SR transistor and drive control are integrated on the same semiconductor chip. Another limitation of the circuit is the apparent use of resistor R1 to turn Q1 off, a common technique for conventional transistors. Schottky diode D3 in series with R1 would prevent turn-on of Q1 in the inverted mode when VCE reverses, but under those conditions R1 would not provide turn-off drive in the form of a reverse base drive current, and turn-off would be relatively slow.

In view of this and related prior art, a need exists for a low cost BJT synchronous rectifier drive circuit and method that achieves:

Automatic turn-on of the BJT SR when current flow would be in a forward direction, and turn-off of the BJT when current flow would be in a reverse direction;

Fast turn-on of a BJT SR through a high initial base drive current;

Fast turn-off of a BJT SR through a high reverse base drive current when the collector-emitter voltage is near zero or negative;

Base drive proportional to VCE (above an offset voltage) during the "on" conduction period without the need for current transformers;

Precise control of the BJT quasi-saturation voltage during the "on" period, without VCE sensing errors due to mismatched diode drops, uncompensated diode drop TCs, or TC errors due to differing junction temperatures; and Operation over a range of drive supply voltages without significant change in current control and drive characteristics.

It is further desirable for reduced cost that the circuit and method be capable of operation with a single drive supply voltage and be suitable for realization as an integrated circuit, with or without the power BJT SR integrated on the same semiconductor chip.

The last requirement mandates that the drive circuit consist almost exclusively of diodes, transistors and resistors, with capacitor requirements limited to small value integratable capacitors or external "supply voltage bypass" capacitors or the like. The use of transformers or inductors would also not meet these requirements.

SUMMARY OF THE INVENTION

Accordingly, it is an object of the present invention to provide a BJT SR drive circuit that achieves synchronous rectification in an energy-efficient and a cost-efficient manner.

It is another object of the present invention to provide such a drive circuit that achieves rapid turn-on and turn-off of a BJT used as a synchronous rectifier.

It is another object of the present invention to provide a BJT SR drive circuit that operates over a wide range of drive supply voltages.

It is also an object of the present invention to provide a BJT SR that overcomes the shortcomings of the prior art and achieves the desired features set forth above.

These and related objects of the present invention are achieved by use of an apparatus and method for control and driving BJT used as synchronous rectifier as described herein.

BRIEF DESCRIPTION OF THE DRAWINGS

FIGS. 3A–3C illustrate the basic construction and control properties of a MOSFET.

FIGS. 4A–4D illustrate the basic construction and control properties of a BJT.

FIG. 5 illustrates a schematic diagram of a prior art circuit that uses a current transformer to drive a BJT with a proportional base drive current.

FIG. 6 illustrates a schematic diagram of a prior art circuit that uses a current transformer to drive a BJT SR.

FIG. 7 illustrates a schematic diagram of a prior art circuit for driving a BJT with a positive or negative voltage source.

FIGS. 8–9 illustrate schematic diagrams of prior art circuits for driving a BJT from a single voltage source.

FIGS. 10–11 illustrate schematic diagrams of prior art circuits that use a Baker clamp to prevent saturation of a BJT.

FIG. 12 illustrates a schematic diagram of a prior art method of driving a BJT SR from windings on power converter magnetics.

FIGS. 13A–13B illustrate a schematic diagram of a prior art method for driving a BJT with a proportional base drive without a current transformer.

FIGS. 14A–14B illustrate a schematic diagram of a prior art method of driving a BJT as a blocking diode.

FIG. 15 illustrates a schematic diagram of a prior art integrated circuit for driving a BJT SR.

FIGS. 19–21A illustrate progressively detailed schematics of circuits in accordance with the present invention.

It should be recognized that various figures user the same designators when the similarly designated components serve the same function, (with the exception of FIGS. 12–15 which are reproduction from prior art documents).

DETAILED DESCRIPTION

Figure 1A:
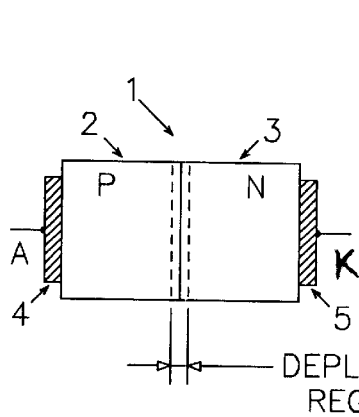
FIGS. 1A–2C illustrate the basic construction and rectification behavior of P-N junction diodes.
Figure 1B:
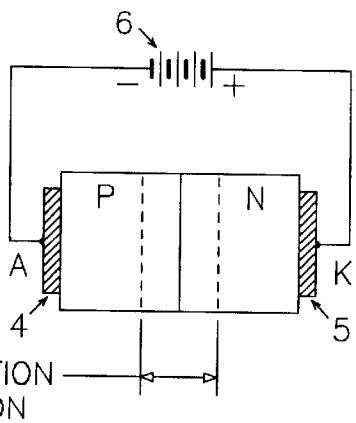
Figure 1C:
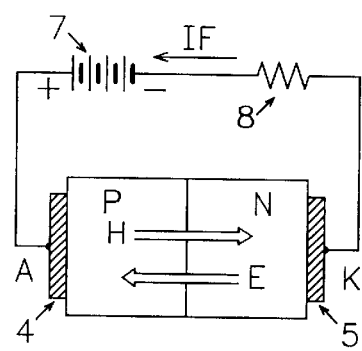
Figure 2A:
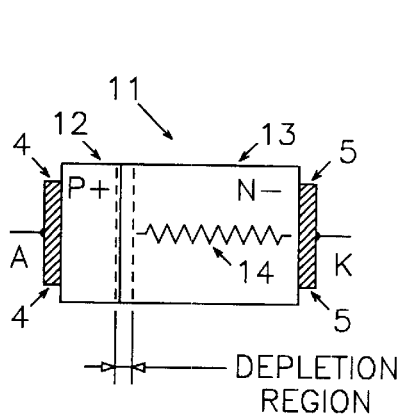
Figure 2B:
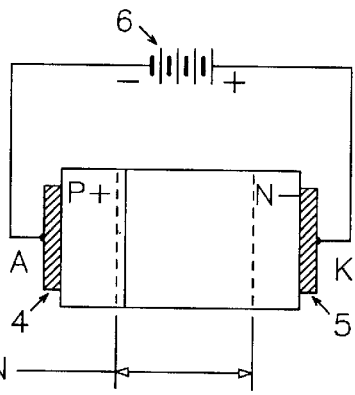
Figure 2C:
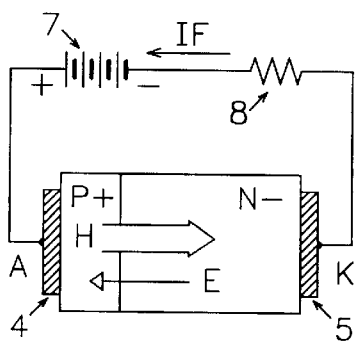
Figure 16A:
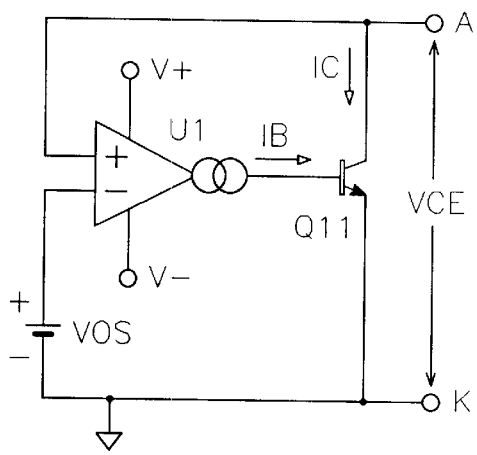
FIGS. 16A–16D illustrate diagrams of a circuit for driving a BJT SR with proportional base drive in accordance with the present invention.
Figure 16B:
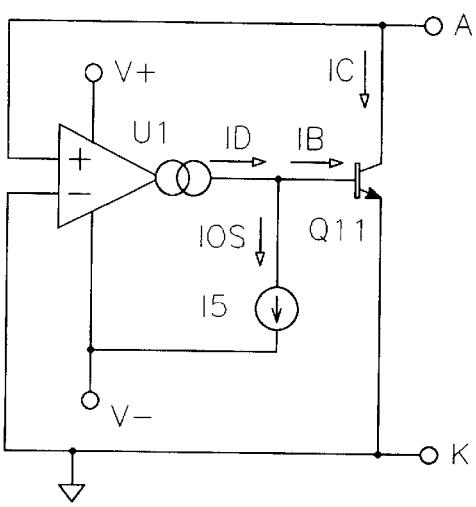
Figure 16C:
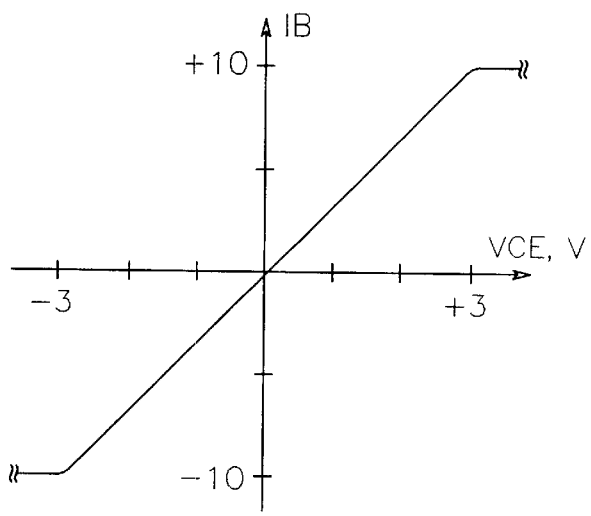
Figure 16D:
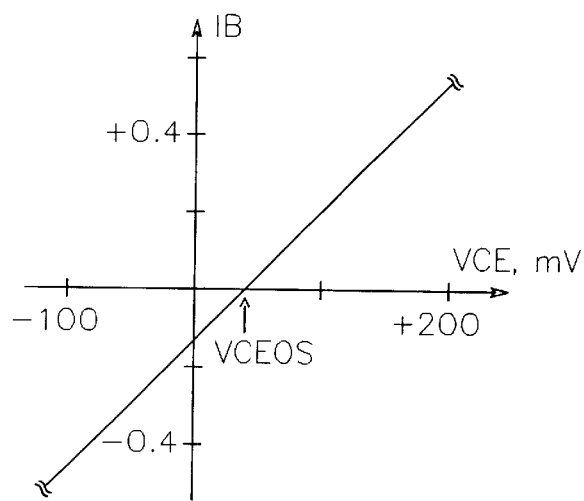

Referring to FIGS. 16A–B, two exemplary schematic diagrams of a circuit for driving a BJT SR in accordance with the present invention are shown. FIGS. 16C–16D illustrate plots that correspond to the embodiments of FIGS. 16A–16B.

FIG. 16A illustrates a transconductance amplifier (defined above) that has inputs that are directly coupled across the collector and emitter of a BJT SR Q11. It should be recognized that the transconductance amplifier designation represents the function of transconductance amplification and the actual implementation, as illustrated elsewhere herein, is carried out with component devices that are preferably fabricated on a semiconductor substrate.

The connection of the transconductance amplifier inputs is made without the use of a series diode and its accompanying voltage drop (such as diode D in the prior art of FIG. 13A). The connection is further made with no other sources of significant voltage sensing error, for example, there are no unmatched or uncompensated diodes, transistors or like devices. U1 thus accurately senses the collector-emitter voltage VCE of SR BJT Q11 and provides a base drive current IB essentially proportional to the voltage difference between the positive (+) and negative (−) inputs of amplifier U1. Furthermore, the VCE at which IB=0 is "offset" from VCE=0 to VCEOS by a small positive "offset" voltage VOS, typically on the order of 5 mV to 50 mV. Under current state of the art practices this may be closer to the 30–40 mV range, but may decrease in the future, or be otherwise different while still providing the IB v. VCE relationship discussed herein. This VCEOS is the offset voltage provided in equation 4.

In the embodiment of FIG. 16A, the offset voltage is realized by placing a positive offset voltage source VOS in series with the negative input of U1. The base drive current IB is now zero when VCE=VOS. VOS is in this instance thus VCEOS. The same result could be achieved by placing a negative offset voltage in series with the positive input of U1 (not shown).

Referring to FIG. 16B, an equivalent result is achieved by coupling an offset current source "IOS" to the output of amplifier U1, rather than coupling an offset voltage source to the input. The magnitude of IOS is chosen to equal the U1 output drive current ID (and thus cause the Q11 base current IB to be zero) when the VCE of Q11 is equal to the desired offset voltage VCEOS. As alluded to above, the equivalent of an input offset voltage can be accomplished by an intentional small fixed imbalance anywhere in the transconductance amplifier, VCE sensing or base drive circuit, including integrated circuit transistor "size" differences to produce a well defined difference in conduction characteristics, generally consistent with the dictates of Eq'n 4.

The global or overall control and driving function of U1 is plotted in FIG. 16C. The horizontal axis is the VCE of SR BJT Q11 in volts at a scale which might be typical in low voltage rectification applications, though the present invention is not limited to low voltage rectification applications. The vertical axis is Q11 base current, which is shown in arbitrary units of current because the value in practical applications may range from a few milliamps or less to several amps or more. It can be seen that IB is essentially proportional to VCE over a wide range of collector-emitter voltages (the effect of VCEOS at this scale is not readily discernable).

Above some value of VCE the drive output of amplifier U1 will typically "limit" or "flatten off" in many circuits where a SR may typically be utilized. This is shown to occur at about ±3V in the illustrated plot though the "limit" voltage may differ in other implementations. This limiting of base drive current may or may not occur within the normal operating VCE range in any given application. The base drive current limiting, however, should occur (if at all) well above the maximum normal VCE conduction voltage (typically 50–200 mV) such that a Q11 base overdrive current is generated when a positive collector-emitter voltage is first applied to Q11, which accelerates the Q11 turn-on process.

FIG. 16D plots an IB vs. VCE relationship (in accordance with the present invention) near the origin of the FIG. 16C plot. The effects of offset voltage VCEOS can be observed in FIG. 16D. The base drive IB becomes negative and turns off SR BJT Q11 when there is still a small positive voltage VCE on Q11. The VCE of Q11 during normal conduction will thus always be greater than VCEOS. As discussed in the Background of the Invention section and shown in equation (4), this small VCEOS (or small "imbalance") in the SR BJT conduction voltage is required to realize an ideal IB vs. VCE relationship over a broad range of BJT collector currents.

In operation, the BJT SR is initially "off" when a forward voltage is first applied, but the relatively high VCE causes a high forward IB to flow, which provides a high base drive turn-on pulse until VCE falls to the operating level, i.e., a steady-state condition. This momentary forward voltage is analogous to the "forward recovery" voltage for a P-N junction diode.

During conduction, the proportionality between IB and VCE (with VCEOS) provides the optimal base drive current for a given conduction current, as required by equation (4) above.

The turn-off of SR BJT Q11 is initiated by a reverse base current IB when the VCE falls below VCEOS or reverses. Note that the reverse or negative base drive current shown in these and subsequent figures is that which is available to turn the SR BJR off, and flows only during the turn-off transition. Once the SR BJT is off, reverse base current preferably falls to essentially zero.

A drawback of the embodiment of FIG. 16 is that while a high reverse VCE generates a high reverse IB and the turn-off of conduction current may be reasonably fast, a low reverse VCE (and IB) results in slower Q11 turn-off. Another disadvantage of the embodiment of FIG. 16A is that it requires two drive supply voltages of opposite polarities as shown by the "V+" and "V−" inputs to amplifier U1.

Figure 17A:
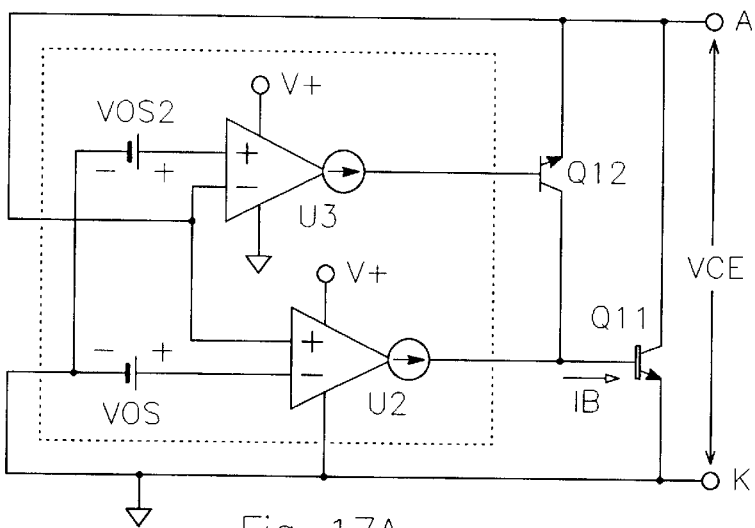
FIGS. 17A–17C illustrate diagrams of an another circuit for driving a BJT SR with enhanced turn-off drive in accordance with the present invention.
Figure 19:
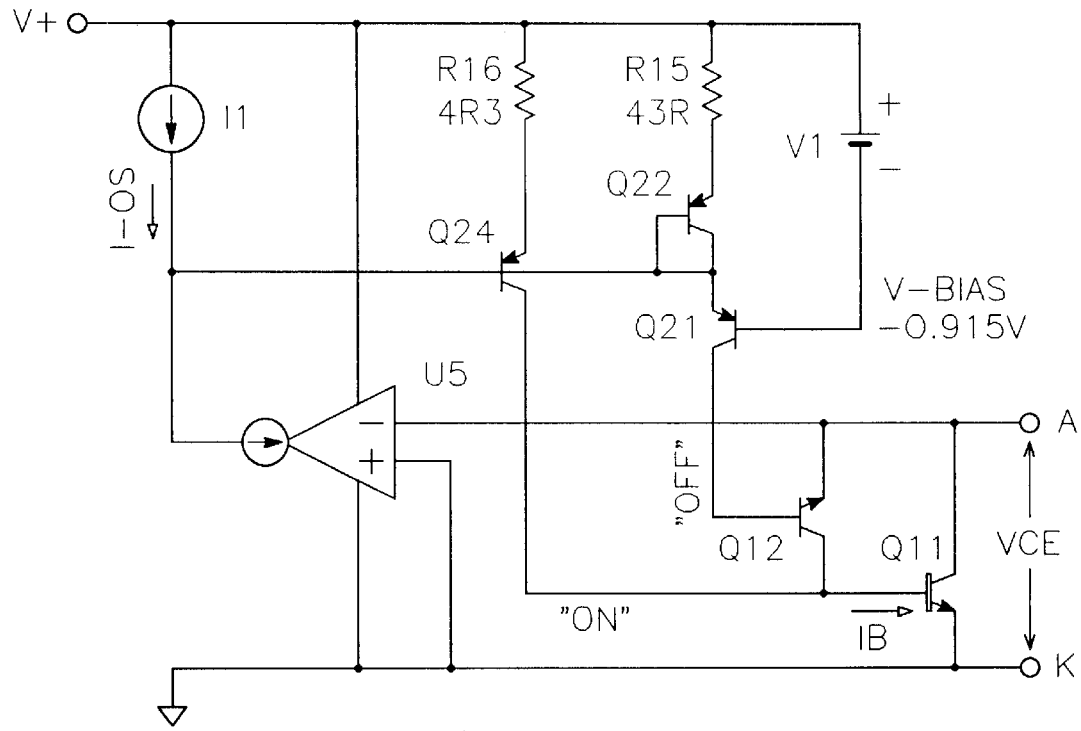

These and other limitations are addressed in the embodiment of FIG. 17A, wherein a single drive supply may be used and turn-off of Q11 is accelerated and almost equally as fast for any reverse collector voltage on Q11. The principle of this embodiment is illustrated by the conceptual circuit shown within phantom line block FIG. 17A. Transconductance amplifiers U2 and U3 are configured in this embodiment to only "source" (provide a positive) output current as indicated by the symbol of an outward pointing arrow within a circle that is added to their outputs. A transconductance amplifier which can only "sink" (provide a negative) current is indicated by the symbol of an oppositely directing arrow within a circuit added to an output as shown in FIG. 19.

Amplifier U2 (coupled to input offset voltage, VOS) functions identically as U1 in FIG. 16A when VCE≦VCEOS, but in this embodiment provides no output current to drive the base of the BJT SR when VCE<VCEOS. The inputs of amplifier U3 are also coupled to the VCE of Q11, but with reverse polarity and with a second offset voltage VOS2 coupled to one input. When VCE is below a first threshold voltage, VTH1 (which equals VOS2) illustrated in FIG. 17B–C (with VTH1<VCEOS, if only by a small amount) amplifier U3 now provides a base drive current to turn on a second transistor or related device Q12 (implemented as a BJT in FIG. 17A) which is connected between the base and collector of Q11 as shown. Since the collector voltage of Q11 is nearly equal to or below (more negative than) the emitter voltage, Q12 provides a low impedance path between the base and collector of Q11, drawing a high reverse base current from Q11 to quickly discharge stored charge at the collector-base junction and quickly turn Q11 off. Amplifier U3 is preferably designed to have a higher transconductance (relative to U2, though this is not necessary) which is further enhanced by the current gain of Q12.

Figure 17B:
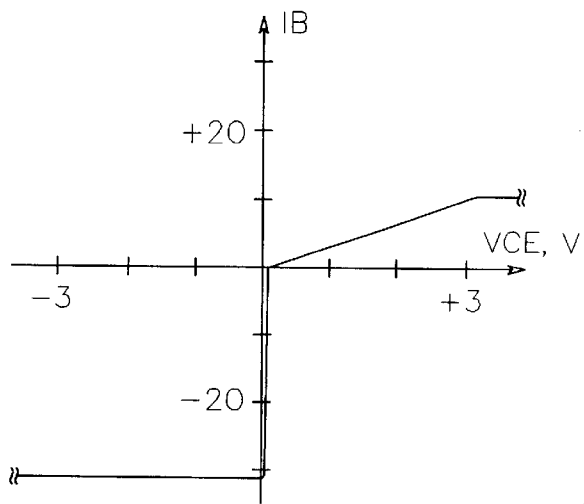

As a result, a high Q11 turn-off base drive is realized when VCE is still at a low negative value, or even slightly positive, as shown in the IB v. VCE plots of FIG. 17B and 17C (which show IB v. VCE relationship in accordance with the present invention). It should be noted that the maximum reverse IB current is limited by the base resistance of Q11 and the conduction impedance of Q12. FIG. 17B shows (with a change in vertical scale from FIG. 16C) that the base drive current to Q11 remains the same with VCE above VCEOS, but that below VTH1 the reverse IB increases much faster and may reach a higher value than in the circuit of FIG. 16, providing a faster turnoff with any Q11 reverse collector-emitter voltage.

Figure 17C:
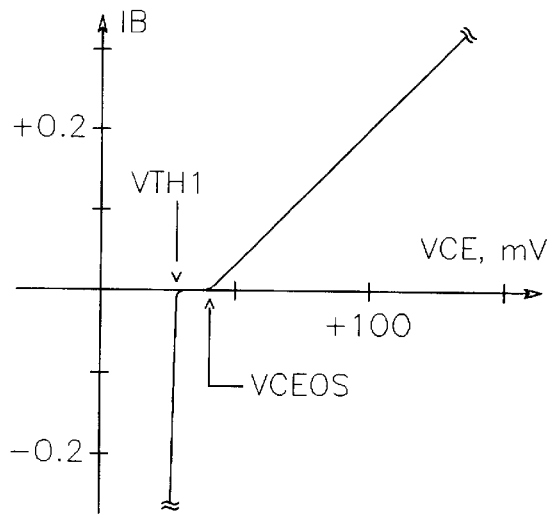
Figure 20:
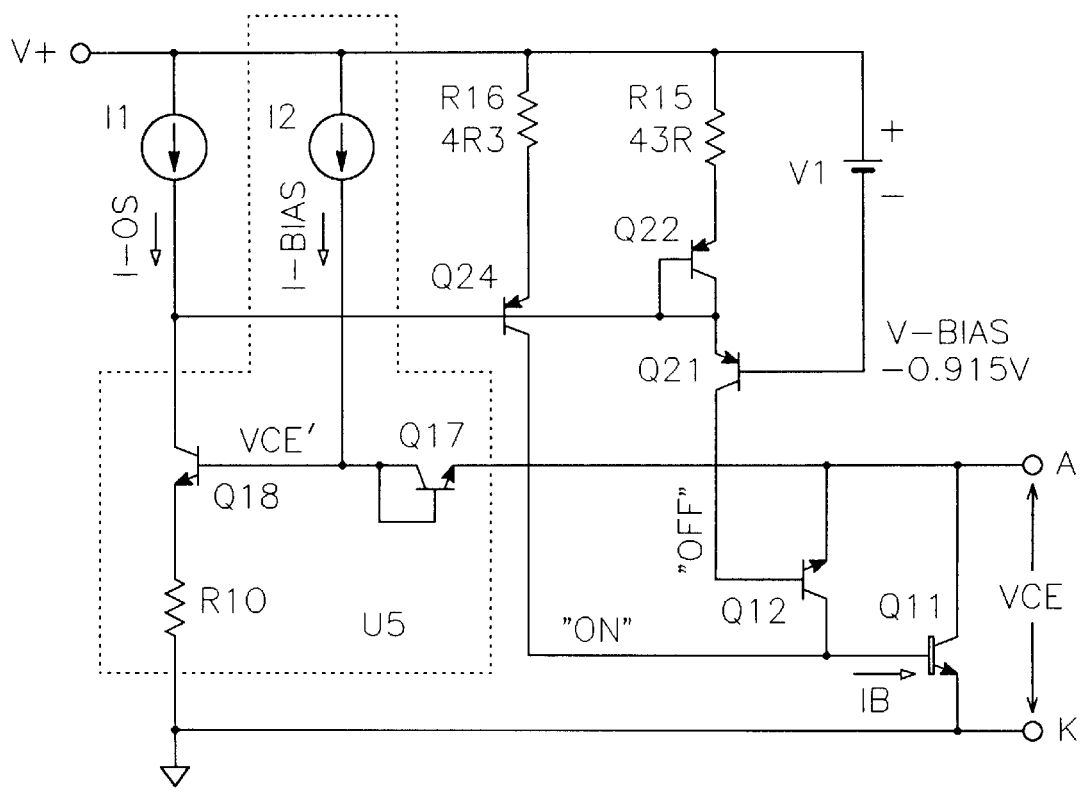

A small scale view of IB vs. VCE near the origin of FIG. 17B is provided by FIG. 17C. FIG. 17C illustrates that VTH1 is typically a small positive voltage, but less than VCEOS. If VTH1µVCEOS, on-off oscillations are likely to occur at low collector currents. A small "dead band" between VTH1 and VCEOS, where essentially no base drive current is provided to either Q11 or Q12, is preferably provided to avoid this potential problem. Again, VOS and VOS2 need not be the discrete voltage sources shown within the conceptual circuit of FIG. 17A, but may be implemented as intentional small imbalances anywhere in the transconductance amplifier, VCE sensing or base drive circuits, including integrated circuit transistor "size" differences to produce a well defined difference in conduction characteristics, or as otherwise known in the art. An alternative implementation is illustrated in the circuits of FIGS. 19–21 below. It should be noted that U2 could also be allowed to conduct a reverse IB, in addition to the base turnoff current provided by U3 and Q12.

There are numerous ways to accomplish the equivalent function of the drive circuit in FIG. 17A, not all of which require physically separable or readily identifiable transconductance amplifiers as will be seen in a subsequent embodiment. Furthermore, the turn-off transistor Q12 in this and other embodiments need not be a BJT of the same polarity as the SR BJT Q11, but may be a BJT of opposite polarity, or a MOSFET or junction field effect transistor (JFET) of either polarity. The configuration and operation of turn-off transistor Q12 is the subject matter of an above-referenced co-pending patent application having Ser. No. 09/971,047.

Figure 18A:
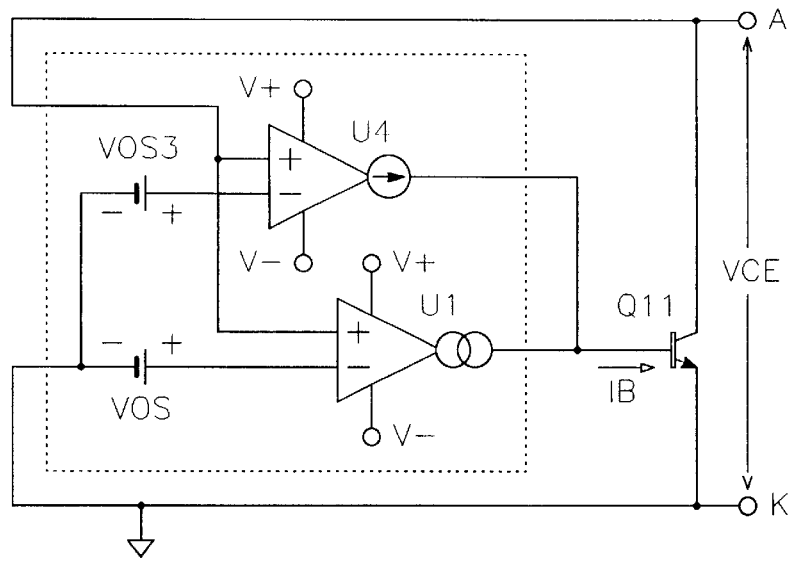
FIGS. 18A–18C illustrate diagrams of an another circuit for driving a BJT SR with enhanced turn-on drive in accordance with the present invention.

FIG. 18A illustrates a BJT SR driving circuit in accordance with the present invention in which the turn-on speed of a SR BJT can be improved over that of the preceding embodiments. This principle is illustrated conceptually with the circuit shown within the phantom line block where transconductance amplifier U1 and the input offset voltage VOS both function as discussed with reference to FIG. 16A. A second threshold voltage, VTH2, is preferably provided (by VOS3 coupled to the negative input of U4) in the embodiment of FIG. 18A and when the VCE of Q11 is above VTH2 (=VOS3) transconductance amplifier U4 provides additional base drive current (in addition to U1) to turn Q11 on faster. VTH2 is preferably placed just above the VCE occurring during conduction of the maximum collector current, but may be located somewhat lower if needed, for example, to compensate for a reduction in Q11 current gain β at high collector currents.

Figure 18B:
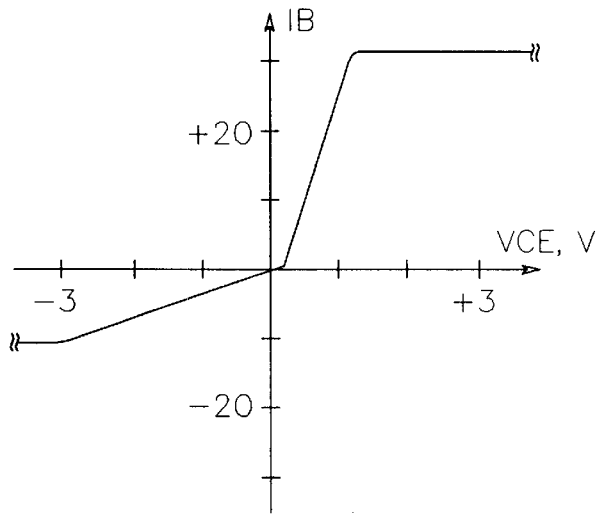
Figure 18C:
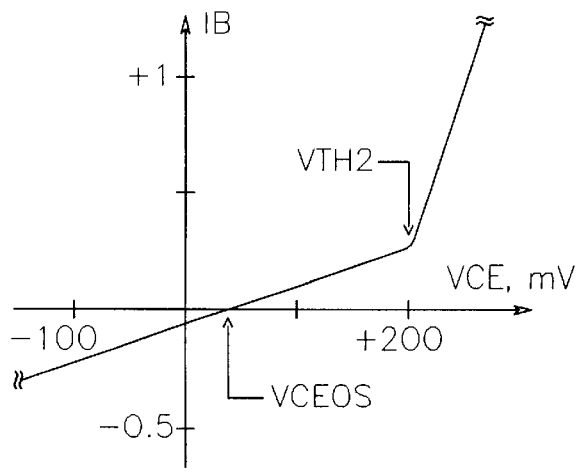

FIGS. 18B and 18C illustrate an IB v. VCE relationship of the embodiment of FIG. 18A in accordance with the present invention. FIGS. 18B and 18C show (with a relative change in vertical axis magnitude from FIGS. 16B and 16C) that the base drive to Q11 remains the same with VCE below VTH2, but with VCE above VTH2, the Q11 base current IB increases significantly faster and may be designed to reach a higher drive current level before limiting, providing a faster Q11 turn-on. An expanded view of IB vs. VCE near the origin is shown in FIG. 18C where the behavior near VTH2 is more clearly seen.

There are numerous ways to accomplish the equivalent function of the drive circuit in FIG. 18A, not all of which incorporate physically separable, discrete or readily identifiable transconductance amplifiers, as will be seen in subsequent embodiments. As before, VOS and VOS3 need not be the discrete voltage sources shown within the conceptual circuit, but may be implemented as intentional small fixed imbalances anywhere in the transconductance amplifier, VCE sensing or base drive circuits, or as otherwise known in the art. An alternative approach would be to sense the IB drive from U1, and multiply further increases in IB by a given factor when IB is above that which occurs at VCEOS3, using a circuit similar to the "off drive multiplier" described in conjunction with FIG. 21A below.

Of course, it is possible to combine the advantages of the circuits of FIGS. 17–18, as will be illustrated later in the preferred embodiment of FIGS. 21A–C.

FIG. 19 is a more detailed schematic diagram of a another embodiment of a BJT SR driving circuit in accordance with the present invention, which incorporates the accelerated turn-off principles illustrated in FIG. 17, in addition to a preferred requirement of a single drive supply voltage.

The embodiment of FIG. 19 utilizes a transconductance amplifier U5 (which provides an output current sink) and an offset current I-OS (from current source I1) coupled to the output of U5 which results in the desired VCEOS in the IB v. Q11 VCE relationship. When the VCE of Q11 is below VCEOS, the negative (or sink) current output of transconductance amplifier U5 is less than the offset current I-OS of current source I1. (Note that VCEOS is provided by I-OS and the transconductance characteristics of U5.) Under these conditions, the excess current from I1 flows into the emitter of Q21, whose base is preferably held at a bias voltage of about 0.915 volts (or about 1.5 times the VBE of a silicon BJT, which provides a "dead band" between the conduction of Q21 and Q22) below the drive supply voltage V+ by voltage source V1 (V-BIAS). The Q21 collector current then drives the base of Q12, which holds SR Q11 in the "off" state. When the VCE of Q11 exceeds VCEOS, the U5 output current becomes greater than I-OS. This produces a reversed net current flow that turns off Q21 (and Q12) and current begins to flow through the diode connected BJT Q22 and resistor R15 network. The relative currents in Q22 and Q24 are largely determined by the 10:1 resistance ratio of R15/R16, increasing the transconductance gain of U5 by this same ratio. The positive base drive IB to Q11 is then proportional to (VCE−VCEOS) as desired. When the VCE of Q11 again falls below VCEOS, the Q24 drive current ceases and Q21 conducts shortly thereafter, turning Q12 on and Q11 quickly off, utilizing the principle discussed with reference to FIG. 17. With a V-BIAS voltage 1.5 times the VBE of a BJT, Q12 and Q24 cannot simultaneously conduct, providing a small but definite VCE dead band between VCEOS (above which SR BJT Q11 is driven to conduct) and VTH2 (below which Q12 is driven to conduct), and thereby turn Q11 off.

The circuitry of transconductance amplifier U5 in FIG. 19 is shown in more detail in FIG. 20. Components I2, Q17, Q18 and R10 preferably comprise the transconductance amplifier U5 (in phantom lines) in the schematic of FIG. 20. A current source I2 provides a bias current (I-BIAS) to diode connected BJT Q17, whose emitter is coupled to the collector of SR BJT Q11 and whose base is coupled to the base of Q18. The base voltage of Q18 is VBE', which is higher than the VCE of Q11 by the VBE "diode drop" of Q17. The emitter of Q18 is in turn connected to the emitter of Q11 through resistor R10. Transistors Q18 and Q17 are configured to have matching characteristics and operate at similar currents so the VBE of Q18 closely matches, or in other words effectively compensates for, the "diode drop" or VBE of Q17. Similarly, Q17 compensates for the voltage drop induced by the VBE of Q18. Accordingly, the voltage "sensed" across R10 is essentially equal to the VCE of Q11 when VCE is positive. The current in R10 (and current output of Q18) is thus proportional to the VCE of Q11 as required for a transconductance amplifier. Other methods of matching or compensating for the VBE of Q18 would include the more commonly used differential BJT pair, with coupled emitters and VCE inputs on the base terminals. A differential pair of FETs could also be used to sense the VCE of Q11, as discussed in Note 1 above.

Figure 21A:
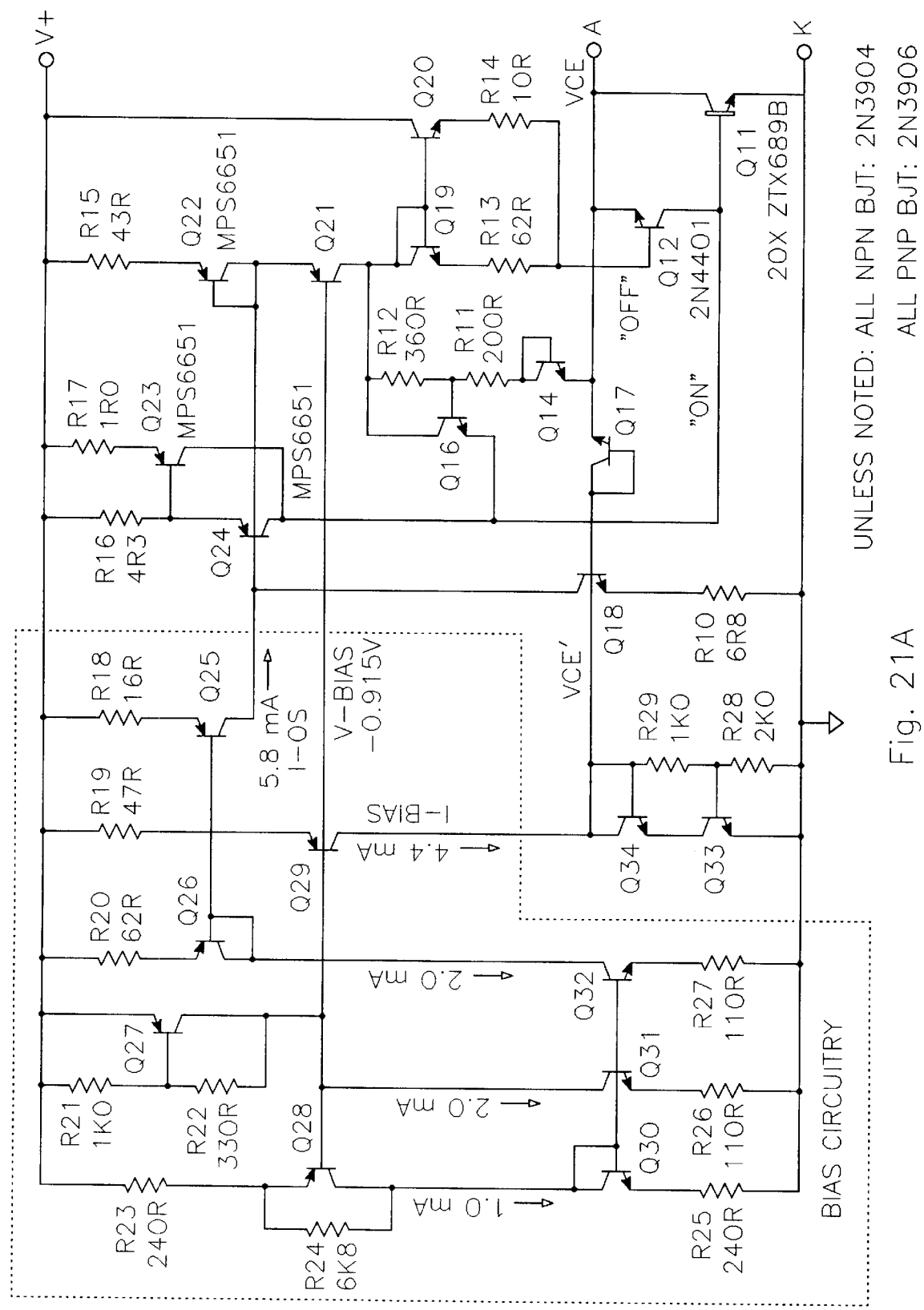

FIG. 21A provides a representative preferred embodiment of an implementation of a BJT SR drive circuit in accordance with the present invention, which incorporates the accelerate turnoff and turn-on principles of FIG. 17 and FIG. 18 respectively. The diagram is also a fully detailed circuit schematic, based on the simplified circuit of FIG. 20. Many of the components of the embodiment of FIG. 21A have their same function as identified in FIGS. 19 and 20. The large part of the circuitry enclosed in the phantom lines and labeled "bias circuitry" functions to provide stable bias currents for I-BIAS and I-OS and bias voltage V-BIAS (all shown in FIG. 20) to the rest of the circuit. Since the design and functioning of bias circuits are known to those versed in the art, the bias circuits are not described further.

The BJT Q11 in the representative or prototype circuit of FIG. 21 may be any suitable BJT SR. Since BJTs are not commonly used as SRs, the embodiment of FIG. 21A was built and tested with a plurality of commercially available small BJTs in parallel. In one embodiment the plurality included 20 matched Zetex ZTX689B transistors, provided in parallel and designed for conduction currents of up to 20–40 A (operating with a forced gain βf of around 140, and VCE about 140 mV at IC=20A). It should also be recognized that Q11 may be implemented as a purpose designed SR BJT, as a discrete chip co-packaged with an integrated control circuit, or as part of an integrated circuit incorporating the SR BJT with the control circuit, amongst other embodiments.

The use of turn-off transistor Q12 incorporates the accelerated turn-off principle of FIG. 17. The Q11 turn-off drive from Q21 to Q12 is further preferably amplified by a ratio, for example, of about 7:1 by transistors Q19 and Q20, due primarily to the ratio of respective emitter resistors R13 and R14. Deep saturation of the turn-off transistor Q12 is preferably prevented by an anti-saturation circuit which herein includes Q14, Q16, R11 and R12. The VBEs of BJTs Q12 and Q14 are similar so that the sum of the voltages on resistors R11 and R12 is essentially the same as the sum of the VBE of BJT Q19 and the voltage on R13, or about 960 mV in this representative embodiment. The voltage on R11 is a little more than ⅓ of this sum, or about 340 mV. Since the VBE of BJTs Q14 and Q16 are also similar, Q16 conducts and diverts "off" drive away from Q19 when SR BJT Q11 is essentially "off" and the VCE of Q12 has fallen to about 340 mV. This also reduces the amplified drive current in Q20, and thereby reduces the overall turn-off drive current to Q12 once Q11 is turned off, reducing the off-drive power consumption.

When the VCE of Q11 rises to 160 mV, the voltage on R16 is about 770 mV, causing Q23 to begin to conduct through resistor R17. Q23 has an effective emitter resistance of about 0.4 Ω so that when Q23 conducts the SR BJT Q11 base current increases about 4 times faster with VCE>160 mV, as can be seen in the Q11 IB vs. VCE plots of FIGS. 21B and 21C. Thus, the accelerated turn-on principle shown in FIG. 18 is provided.

Figure 21B:
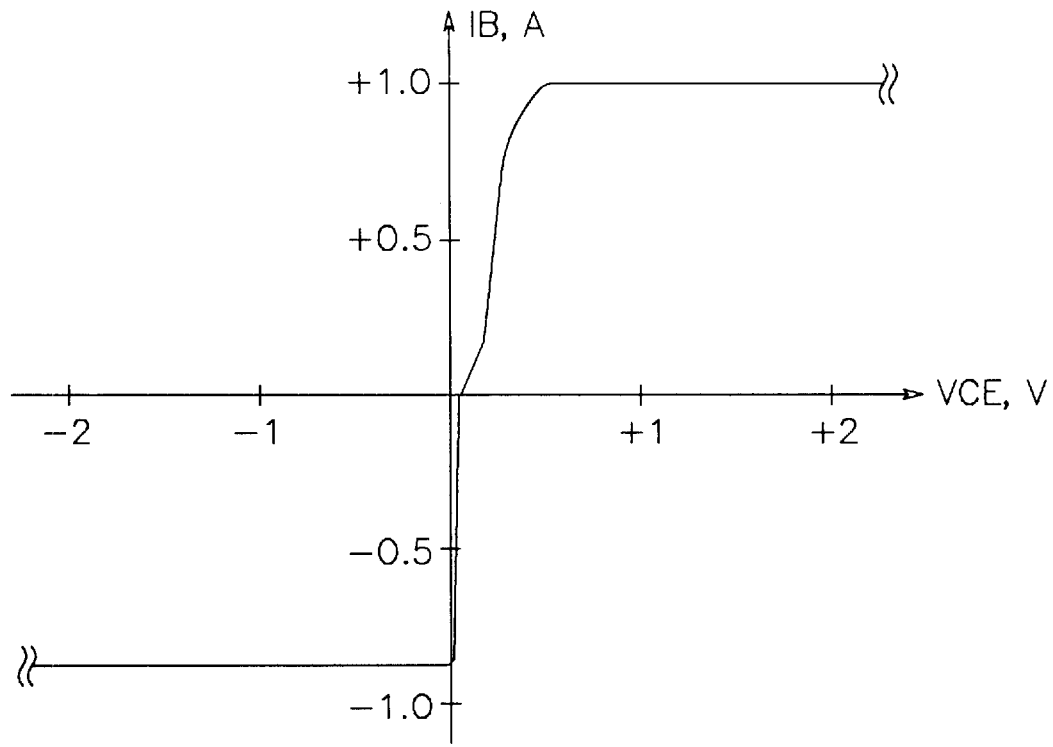
FIGS. 21B–21C illustrate plots related to the function of the circuit of 21A.
Figure 21C:
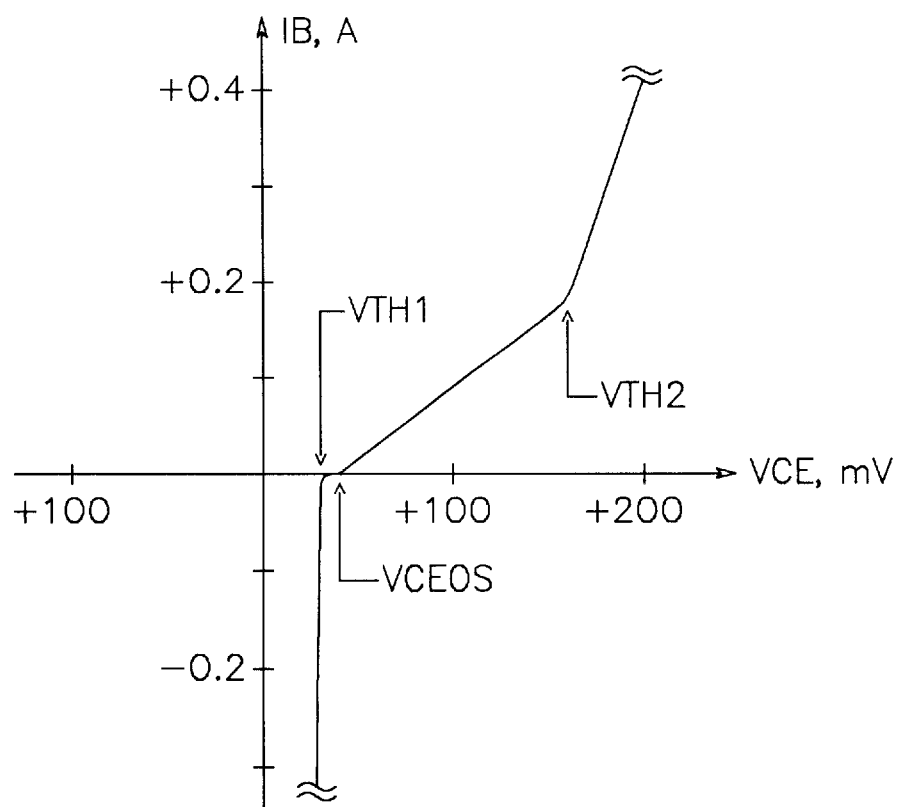

The large scale plot of FIG. 21B shows the Q11 base turn-off drive reaching about 800 mA as the VCE of Q11 approaches zero. In the small scale plot of IB vs. VCE in FIG. 21C, it can be seen that the VCEOS is about 40 mV when forward conduction commences and the drive transconductance increases at a voltage of about 160 mV (VTH2), corresponding to an IC of Q11 of about 24 A.

Transistor Q33, Q34 and resistors R28, R29 preferably form a voltage clamp at about 1.0 V on the base voltage of Q18 to limit peak drive currents in the control circuitry. This can be seen in FIG. 21B at a forward drive current of about 1 A. (This clamp circuit configuration also prevents significant reverse current flow when the VCE of Q11 is negative.)

Figure 22:
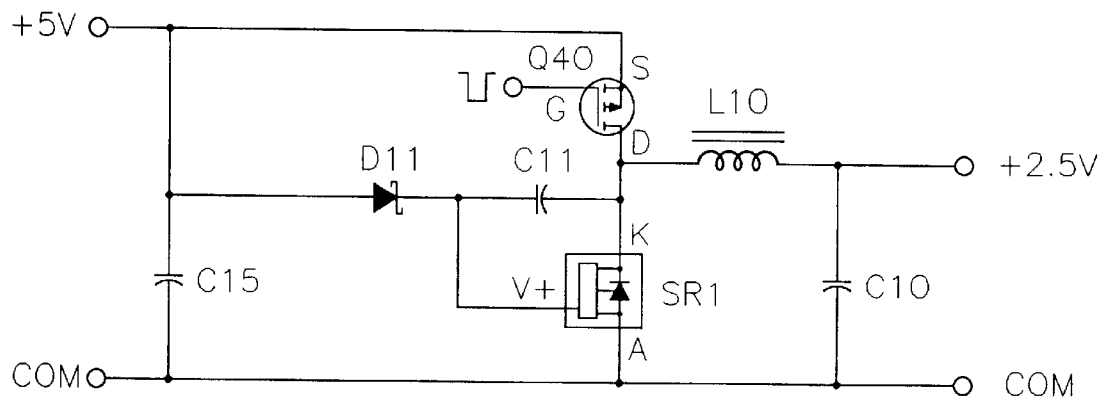
FIGS. 22–24 illustrate representative circuit applications of a SR BJT and control circuit (when combined and implemented as a three terminal "device").
Figure 23:
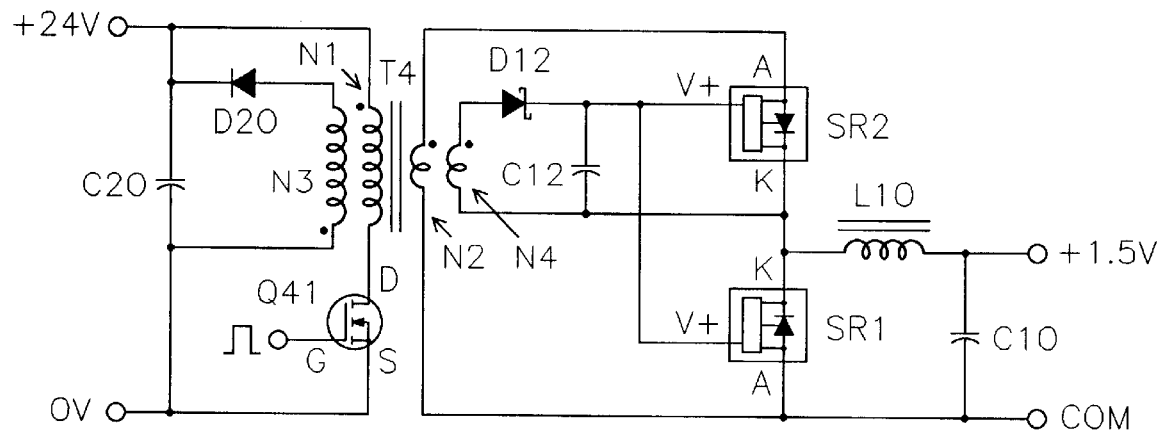
Figure 24:
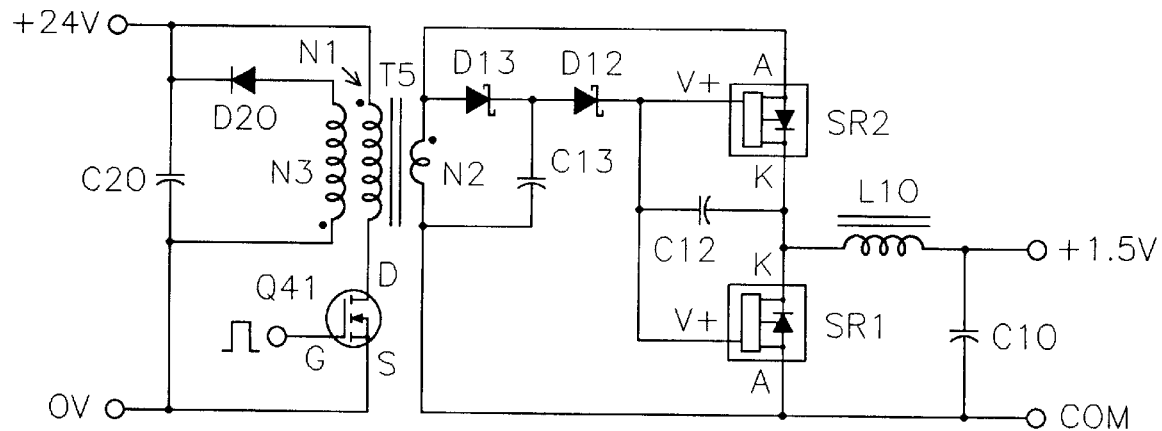

FIGS. 22–24 illustrate several ways in which an NPN BJT SR and control circuit can be utilized in practical applications. For these illustrations it is assumed that the SR BJT and control circuit have been integrated or co-packaged as a self-driven synchronous rectifier "device" with at least three terminals, designated SR1 and SR2 in the figures. The SR terminals are the anode A, cathode K (indicating their functional equivalence to diode rectifiers), and supply voltage V+. A synchronous rectification device may include all of the circuitry in FIG. 21A, as an example. (If the SR BJT were a PNP device, the supply voltage would be negative (V−) relative to the emitter of the SR BJT.) In FIG. 22 SR1 serves as the catch or circulating diode in an otherwise conventional buck regulator, such as might be used for a point-of-load voltage regulator module (VRM). In this example, a +5V supply is regulated to +2.5V, as might be required by a microprocessor chip. The V+ supply is provided by the voltage on C11, which is charged from the +5V supply through diode D11 when SR1 is conducting. When P-channel MOSFET Q40 is turned on by a negative gate drive voltage with respect to the source (shown by the pulse symbol at the gate), SR1 is reverse biased and is turned off by the control circuit to block conduction, and output filter inductor L10 is connected to the +5V input, allowing L10 to draw current from the input to supply the output power. When Q40 is turned off, SR1 is turned on by the internal control circuit to connect L10 to the circuit common (COM), and L10 continues to supply current to the output. FIG. 23 illustrates the use of two SR devices, SR1 and SR2, in the output of a single ended DC—DC forward converter. When the input MOSFET Q41 is on, the primary winding N1 of transformer T4 is coupled to the +24V input supply, and SR2 conducts to supply current from the secondary winding N2 of T4 to the filter inductor L10, during which SR1 is off. When Q41 turns off the voltages on N1 and N2 reverses, and is clamped on the primary side by winding N3 conducting through D20 to the input voltage. The reversed voltage on N2 causes SR2 to turn off, and SR1 to turn on to conduct the current in L10, as in the regulator of FIG. 22. The V+ supply for both SR1 and SR2 is provided by the voltage on C12, which is charged through D12 by the N4 winding of T4 when "Q41 is on. FIG. 24 illustrates an alternative method of providing the V+ supply to SR1 and SR2 in the converter circuit of FIG. 23 which does not require a fourth winding on T4. C12 is now charged through D12 from C13 when Q41 is off and SR1 is conducting. C13 is charged in turn through D13 when Q41 is on, and the voltage on the dotted end of winding N2 is of a positive polarity.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. A control and drive circuit for a BJT rectifier, comprising:
   an input adapted for coupling to a collector and an emitter of a BJT rectifier and configured to comprise a sensing pathway that senses a signal representative of the collector to emitter voltage (VCE) of that BJT rectifier;
   an output adapted for coupling to a base of that BJT rectifier;
   a drive circuit coupled to said input and said output that produces a base drive current (IB); and
   an offset circuit coupled to said drive circuit that provides an offset of a given value (offset value);
   said drive circuit being configured to produce a positive base drive current at said output that is proportional to the sensed VCE minus said offset value when the sensed VCE is essentially greater than said offset value, and to produce a negative base drive current at said output when the sensed VCE is essentially less than said offset value; and
   said sensing pathway being comprised of sensing pathway components and being configured so as to substantially compensate for component induced variations in sensed VCE due to changes in operating conditions.

2. The circuit of claim 1, wherein said sensing pathway is configured such that a VCE sensed through said pathway varies approximately 1.6 mV or less per change in degree C.

3. The circuit of claim 1, wherein said sensing pathway is configured such that a VCE sensed through said pathway varies approximately 1 mV or less per change in degree C.

4. The circuit of claim 1, wherein said drive circuit is further configured to enhance production of said negative base drive current when a sensed VCE is below a first threshold.

5. The circuit of claim 4, wherein said first threshold voltage is below said offset value.

6. The circuit of claim 1, wherein said drive circuit is further configured to enhance production of said positive base drive current when a sensed VCE is above a second threshold.

7. The circuit of claim 1, wherein said offset circuit includes an offset voltage source.

8. The circuit of claim 1, wherein said offset circuit includes an offset current source.

9. The circuit of claim 1, wherein said offset circuit includes circuitry that provides at least one of the functions of:
   inducing an imbalance in said sensing pathway; or
   inducing a variation in the base drive current produced by said drive circuit that approximates the effect of having an imbalance in said sensing pathway.

10. The circuit of claim 1, wherein said driving circuit is configured to produce a base drive current approximately equal to zero, when a sensed VCE is approximately equal to said offset value.

11. The circuit of claim 1, wherein said drive circuit is powered by a single supply voltage.

12. A control and drive circuit for a BJT rectifier, comprising:
   an input adapted for coupling to a collector and an emitter of a BJT rectifier and configured to comprise a sensing pathway that senses a signal representative of the collector to emitter voltage (VCE) of that BJT rectifier;
   an output adapted for coupling to a base of that BJT rectifier;
   a drive circuit coupled to said input and output that produces a base drive current (IB); and
   an offset circuit coupled to said drive circuit that provides an offset of a given value (offset value);
   said drive circuit being configured to produce a positive base drive current at said output when a sensed VCE is approximately greater than said offset value, and to produce a negative base drive current at said output when the sensed VCE is approximately less than said offset value; and
   said sensing pathway being configured to compensate for component induced variations in sensed VCE due to changes in operating temperature.

13. The circuit of claim 12, wherein said sensing pathway includes one or more of a semiconductor junction voltage drop and a PN junction voltage drop and said sensing pathway is configured to compensate for temperature dependent variations induced by said one or more junction voltage drops.

14. The circuit of claim 12, wherein said drive circuit is configured to produce a positive base drive current at said output that is proportional to a sensed VCE minus said offset value when the sensed VCE is approximately greater than said offset value.

15. The circuit of claim 12, wherein said sensing pathway is configured such that a VCE sensed through said pathway varies approximately 1.6 mV or less per change in degree C.

16. The circuit of claim 12, wherein said sensing pathway is configured such that a VCE sensed through said pathway varies approximately 1 mV or less per change in degree C.

17. The circuit of claim 12, wherein said drive circuit is further configured to provide at least one of enhanced production of said negative base drive current when a sensed VCE is below a first threshold or enhanced production of said positive base drive current when a sensed VCE is above a second threshold.

18. The circuit of claim 12, wherein said offset circuit includes one or more of the offset inducing components including:
 an offset voltage source;
 an offset current source; or
 circuitry that provides at least one of the functions of:
  inducing an imbalance in said sensing pathway; or
  inducing a variation in the base drive current produced by said drive circuit that approximates the effect of having an imbalance in said sensing pathway.

19. The circuit of claim 12, wherein said driving circuit is configured to produce a base drive current approximately equal to zero, when a sensed VCE is approximately equal to said offset value.

20. The circuit of claim 12, wherein said drive circuit is powered by a single supply voltage.

21. A control and drive circuit for a BJT rectifier, comprising:

an input adapted for coupling to a collector and an emitter of a BJT rectifier and configured to comprise a sensing pathway that senses a signal representative of the collector to emitter voltage (VCE) of that BJT rectifier;
 an output adapted for coupling to a base of that BJT rectifier;
 a drive circuit coupled to said input and output that produces a base drive current (IB); and
 an offset circuit coupled to said drive circuit that provides an offset of a given value (offset value);
 said drive circuit being configured to produce a positive base drive current at said output that is proportional to a sensed VCE minus said offset value when the sensed VCE is approximately greater than said offset value, and to produce a negative base drive current at said output when the sensed VCE is approximately less than said offset value.

22. The circuit of claim 21, wherein said sensing pathway includes one or more of a semiconductor junction voltage drop and a PN junction voltage drop and said sensing pathway is configured to compensate for temperature dependent variations induced by said one or more junction voltage drops.

23. The circuit of claim 21, wherein said sensing pathway is configured such that a VCE sensed through said pathway varies approximately 1.6 mV or less per change in degree C.

24. The circuit of claim 21, wherein said sensing pathway is configured such that a VCE sensed through said pathway varies approximately 1 mV or less per change in degree C.

25. The circuit of claim 21, wherein said drive circuit is further configured to provide at least one of enhanced production of said negative base drive current when a sensed VCE is below a first threshold and enhanced production of said positive base drive current when a sensed VCE is above a second threshold.

26. The circuit of claim 21, wherein said drive circuit is powered by a single supply voltage.

\* \* \* \* \*